US007650617B2

(12) United States Patent
Hoshino et al.

(10) Patent No.: US 7,650,617 B2
(45) Date of Patent: Jan. 19, 2010

(54) ADVERTISEMENT INSERT APPARATUS AND ADVERTISEMENT INSERT METHOD, AND STORAGE MEDIUM

(75) Inventors: Masaaki Hoshino, Tokyo (JP); Tomohiro Tsunoda, Tokyo (JP)

(73) Assignee: Sony Corporation, Tokyo (JP)

( * ) Notice: Subject to any disclaimer, the term of this patent is extended or adjusted under 35 U.S.C. 154(b) by 1158 days.

(21) Appl. No.: 10/343,777

(22) PCT Filed: Jun. 6, 2002

(86) PCT No.: PCT/JP02/05623

§ 371 (c)(1),
(2), (4) Date: May 19, 2003

(87) PCT Pub. No.: WO02/101700

PCT Pub. Date: Dec. 19, 2002

(65) Prior Publication Data

US 2003/0177490 A1 Sep. 18, 2003

(30) Foreign Application Priority Data

Jun. 6, 2001 (JP) .............................. 2001-171320

(51) Int. Cl.
*H04N 7/16* (2006.01)
(52) U.S. Cl. ...................................................... 725/34
(58) Field of Classification Search .................. None
See application file for complete search history.

(56) References Cited

U.S. PATENT DOCUMENTS 6,507,949 B1 * 1/2003 Jonason et al. ................ 725/22

6,591,248 B1 7/2003 Nakamura et al.
6,654,725 B1 * 11/2003 Langheinrich et al. ........ 705/14
6,698,020 B1 * 2/2004 Zigmond et al. ............. 725/34

(Continued)

FOREIGN PATENT DOCUMENTS

JP 09 051522 2/1997

(Continued)

OTHER PUBLICATIONS

Patent Abstracts of Japan; vol. 2000; No. 22, Mar. 9, 2001; Publication No. JP 2001-142826; published May 25, 2001.

(Continued)

*Primary Examiner*—John W Miller
*Assistant Examiner*—Oschta Montoya
(74) *Attorney, Agent, or Firm*—Finnegan, Henderson, Farabow, Garrett & Dunner, L.L.P.

(57) ABSTRACT

An objective function and a constraint expression are established by a scheme of the invention as conditions for selecting advertisement information to be inserted into a slot in a content. The objective function is used to maximize a total of cost values held by the advertisements selected to be inserted into slots. The constraint expression is used to equalize totaled lengths of the selected advertisements with the length of the slots. The objective function and constraint expression making up the selection conditions are solved as a mathematical programming assignment problem, whereby advertisement information is selected for insertion into predetermined slots in a manner maximizing the benefits of the parties participating in the scheme. In a setup of moving picture streaming distribution, the scheme allows suitable advertisement information to be inserted selectively into slots of contents.

16 Claims, 20 Drawing Sheets

U.S. PATENT DOCUMENTS

| | | | |
|---|---|---|---|
| 2002/0049635 A1* | 4/2002 | Mai et al. | 705/14 |
| 2002/0069408 A1* | 6/2002 | Abe et al. | 725/36 |
| 2006/0161952 A1* | 7/2006 | Herz et al. | 725/46 |

FOREIGN PATENT DOCUMENTS

| | | |
|---|---|---|
| JP | 2000-163477 | 6/2000 |
| JP | 2001-142826 | 5/2001 |

OTHER PUBLICATIONS

Patent Abstracts of Japan; vol. 2000; No. 9; Oct. 13, 2000; Publication No. JP 2000-163477; published Jun. 16, 2000.

Marc Langheinrich et al., "Unintrusive Customization Techniques for Web Advertisement", Proc. of World Wide Web 8, 1999, especially Chapter 3, "The ADWIZ System", Aug. 21, 2002, pp. 1-20.

Peter J. Danaher, "Optimizing Response Functions of Media Exposure Distributions", Journal of the Operational Research Society, vol. 42, No. 7, Jul. 1991, pp. 537-542.

Marc Langheinrich et al., "Unintrusive Customization Techniques for Web Advertising," NEC Corporation, C&C Media Research Laboratories, Kawasaki, Kanagawa Japan.

Peter J. Danaher, "Optimizing Response Functions of Media Exposure Distributions," J. Opl Res. Soc., 1991, pp. 537-542, vol. 42, No. 7, Great Britain.

* cited by examiner

FIG. 8

| PLAYER | DATA TYPES | DATA NAMES | | | GRADE IN NUMBERS | | DETAILS |
|---|---|---|---|---|---|---|---|
| | | | SUB-TRGT | | | | |
| Subscriber (SUBSCRIBER) | ATTRIBUTE (attribute) | Subscriber DATA | | | NONE (0 or 1) | $C^{(a31)}$ | SEX, DATE OF BIRTH, COUNTRY OF RESIDENCE, AREA OF RESIDENCE, ZIP CODE FOR PLACE OF RESIDENCE, ID FOR COUNTRY OF EMPLOYMENT, ID FOR AREA OF EMPLOYMENT, ZIP CODE FOR AREA OF EMPLOYMENT, MOTHER TONGUE, KNOWLEDGE OF FOREIGN LANGUAGES, JOB ID, ANNUAL INCOME ID, MARITAL ATATUS, RESIDENCE ID, AND FAMILY STRUCTURE. $C^{(a1)}=1$ ONLY UPON MATCHING WITH T_TARGET_INOUT (→SUBSCRIBER ATTRIBUTES) |
| | | (SUBSCRIBER OPTINOUT DATA) | T_OPT_INOUT | POSITIVE SIDE | $0 \sim 1.0$ | $C^{(a32)}$ | OPT CATEGORY (EITHER ALWAYS TAKES 0) |
| | | | | NEGATIVE SIDE | | $C^{(a33)}$ | |
| | OPTINOUT (→ADVERTISEMENT) | SUBSCRIBER OPTINOUT DATA | T_OPT_INOUT | | $-1.0 \sim 1.0$ | $C^{(a41)}$ | OPT CATEGORY |
| ad (ADVERTISEMENT INFORMATION) | ATTRIBUTE (attribute) | ADVERTISEMENT META DATA | T_AD | | NONE (0 or 1) | $C^{(a11)}$ | ADVERTISEMENT ID ONLY (ID FOR UNIQUELY IDENTIFYING ADVERTISEMENT). $C^{(a1)}=1$ ONLY UPON MATCHING WITH T_IMG_INOUT |
| | | SPONSOR CATEGORY DATA | T_ADV | | $0 \sim 1.0$ | $C^{(a12)}$ | TRANSACTION MASTER |
| | | PRODUCT CATEGORY DATA | T_PRD | | $0 \sim 1.0$ | $C^{(a13)} = C^{(a41)}$ | OPT CATEGORY MASTER |
| | OPTINOUT (→CONTENTS) | CONTENT META OPTINOUT DATA | T_ADC_INOUT | | $-1.0 \sim 1.0$ | $C^{(a21)}$ | ID FOR UNIQUELY IDENTIFYING CONTENT |
| | | CONTENT CATEGORY OPTINOUT DATA | T_ADCC_INOUT | | $-1.0 \sim 1.0$ | $C^{(a22)}$ | CONTENT CATEGORY MASTER |
| | OPTINOUT (→SUBSCRIBER) | Target INOUT DATA | T_TRGT_INOUT | to Subscriber ATTRIBUTE | | $C^{(a31)}$ | SEX, AGE FROM, AGE TO, COUNTRY OF RESIDENCE, AREA OF RESIDENCE, ZIP CODE FOR PLACE OF RESIDENCE, ID FOR COUNTRY OF EMPLOYMENT, ID FOR AREA OF EMPLOYMENT, ZIP CODE FOR AREA OF EMPLOYMENT, MOTHER TONGUE, KNOWLEDGE OF FOREIGN LANGUAGES, JOB ID, ANNUAL INCOME ID, MARITAL STATUS, RESIDENCE ID, AND FAMILY STRUCTURE |
| | | | | to OPT CATEGORY POSITIVE SIDE | $-1.0 \sim 1.0$ | $C^{(a32)}$ | OPT CATEGORY (EITHER ALWAYS TAKES 0) |
| | | | | to OPT CATEGORY NEGATIVE SIDE | | $C^{(a33)}$ | |
| CONTENTS | ATTRIBUTE (attribute) | CONTENT META DATA | T_CONTENT | | NONE (0 or 1) | $C^{(a21)}$ | CONTENT ID FOR UNIQUELY IDENTIFYING CONTENT). $C^{(a1)}=1$ ONLY UPON MATCHING WITH T_TDC_INOUT |
| | | CONTENT CATEGORY DATA | T_CONT_CAT | | $0 \sim 1.0$ | $C^{(a22)}$ | CONTENT CATEGORY MASTER |
| | OPTINOUT (→ADVERTISEMENT) | ADVERTISEMENT INOUT DATA | T_IMG_INOUT | | $-1.0 \sim 1.0$ | $C^{(a11)}$ | ID FOR UNIQUELY IDENTIFYING ADVERTISEMENT INFORMATION |
| | | SPONSOR INOUT DATA | T_ADV_INOUT | | $-1.0 \sim 1.0$ | $C^{(a12)}$ | TRANSACTION MASTER |
| | | PRODUCT INOUT DATA | T_PRD_INOUT | | $-1.0 \sim 1.0$ | $C^{(a13)}$ | OPT CATEGORY MASTER |
| ADVERTISEMENT SELECTION BUSINESS (Dad) | BUSINESS OPERATOR'S POLICY | SCORING BETWEEN DIFFERENT TYPES OF MATCHING | | | $0 \sim 1.0$ | $C^{(b1)}$ | SCORE USED IN FOUR TYPES OF MATCHING ARE DETERMINED |
| | | SCORING BETWEEN DIFFERENT CATEGORIES | | | $0 \sim 1.0$ | $C^{(b2)}$ | SCORE BETWEEN CATEGORIES (LARGE, MEDIUM, SMALL) ARE DETERMINED FOR EACH OPTINOUT DATA ITEM HAVING A CATEGORY |

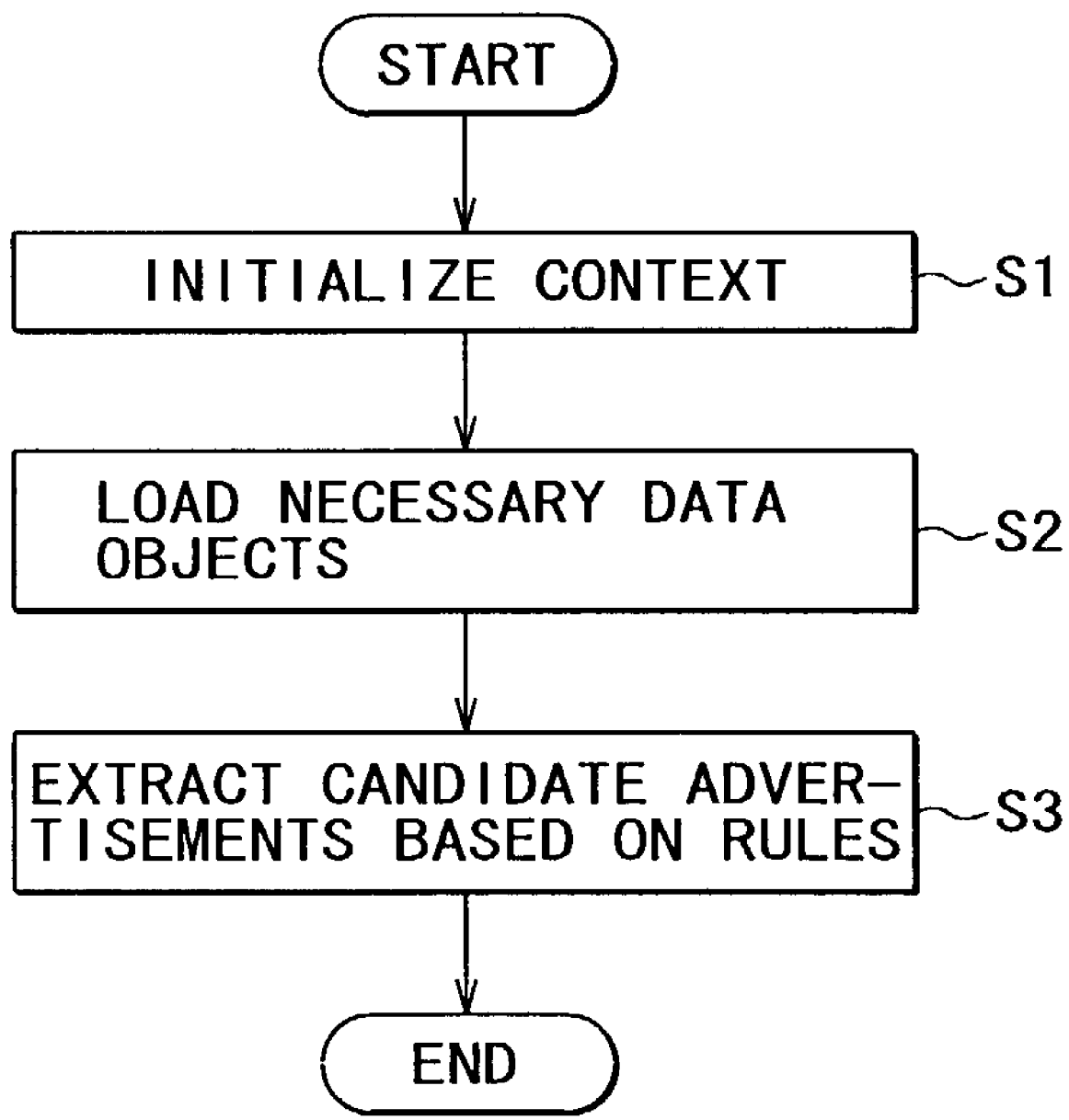

FIG. 11

| Matching | Sub Matching | OBJECT TO BE MATCHED | | COST FOR AdTarget$^{(i)}$ | | SCORING BETWEEN DIFFERENT TYPES OF MATCHING |
|---|---|---|---|---|---|---|
| | | OPTINOUT | ATTRIBUTE | | | |
| M1 | M11 | $c^{(o11)}$ | $c^{(a11)}$ | $costM11^{(i)}$ | $costM1^{(i)}$ | $c^{(p1)}[1]$ |
| | M12 | $c^{(o12)}$ | $c^{(a12)}$ | $costM12^{(i)}$ | | |
| | M13 | $c^{(o13)}$ | $c^{(a13)}$ | $costM13^{(i)}$ | | |
| M2 | M21 | $c^{(o21)}$ | $c^{(a21)}$ | $costM21^{(i)}$ | $costM2^{(i)}$ | $c^{(p1)}[2]$ |
| | M22 | $c^{(o22)}$ | $c^{(a22)}$ | $costM22^{(i)}$ | | |
| M3 | M31 | $c^{(o31)}$ | $c^{(a31)}$ | $costM11^{(i)}$ | $costM1^{(i)}$ | $c^{(p1)}[3]$ |
| | M32 | $c^{(o32)}$ | $c^{(a32)}$ | $costM12^{(i)}$ | | |
| | M33 | $c^{(o33)}$ | $c^{(a33)}$ | $costM13^{(i)}$ | | |
| M4 | | $c^{(o41)}$ | $c^{(a41)}$ | $costM4^{(i)}$ | | $c^{(p1)}[4]$ |

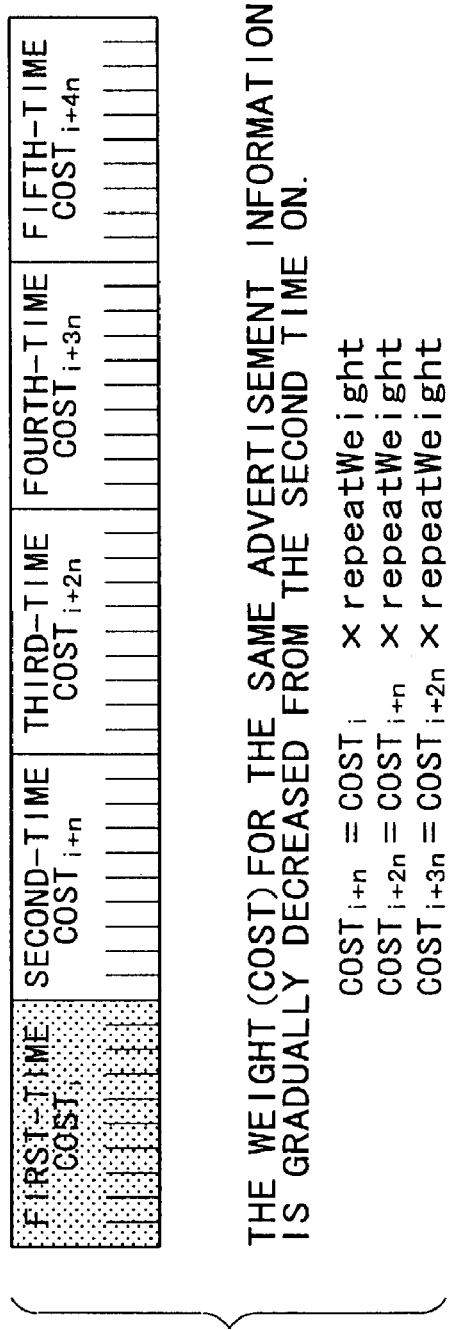

F I G. 2 0
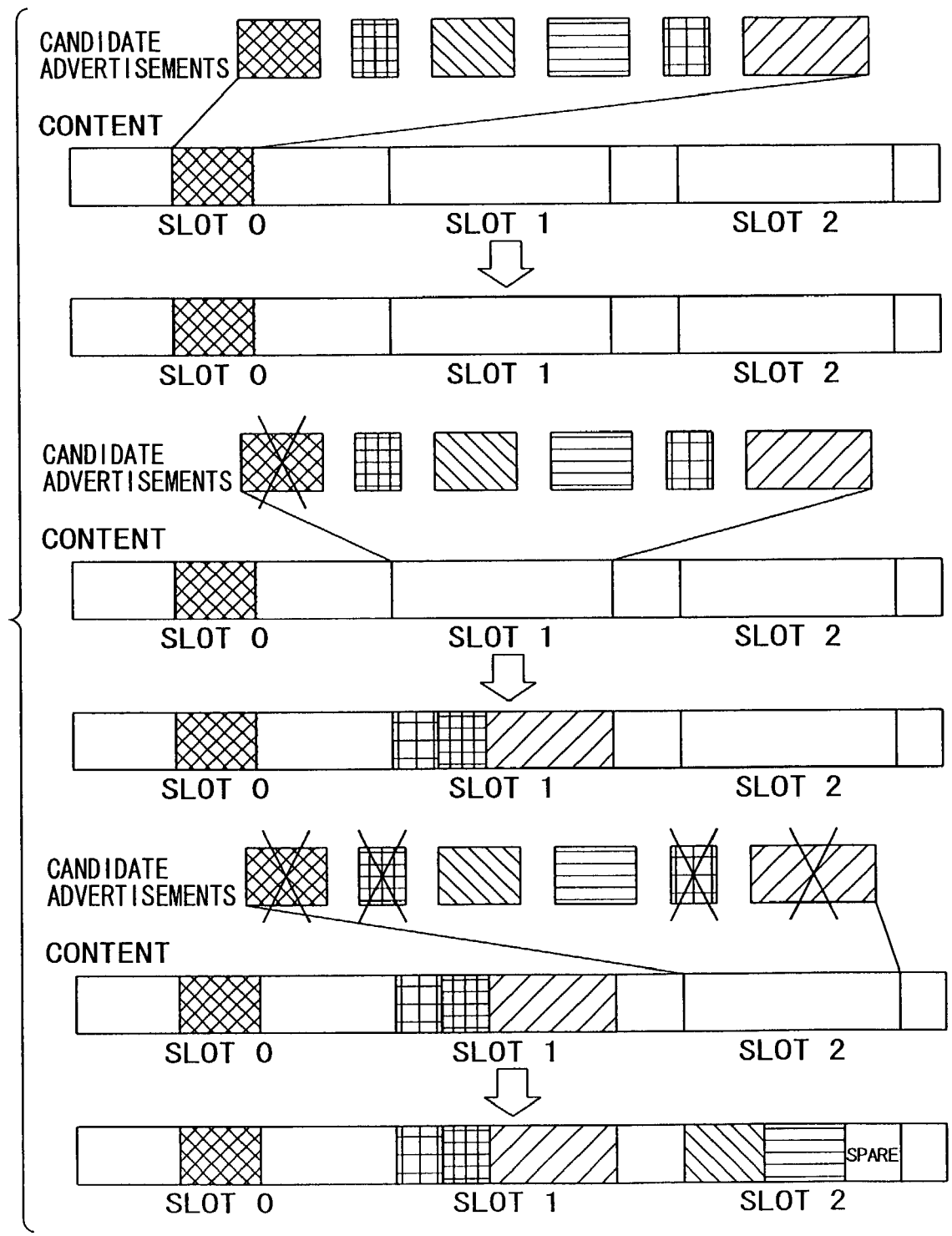

ADVERTISEMENT INSERT APPARATUS AND ADVERTISEMENT INSERT METHOD, AND STORAGE MEDIUM

TECHNICAL FIELD

The present invention relates to an advertisement inserting apparatus, an advertisement inserting method, and a storage medium for properly inserting advertisement information such as commercials into contents made up of time series data typically composed of moving pictures. More particularly, the invention relates to an advertisement inserting apparatus, an advertisement inserting method, and a storage medium for suitably inserting advertisement information into contents such as moving pictures that are distributed over a wide-area network typified by the Internet.

Even more particularly, this invention relates to an advertisement inserting apparatus, an advertisement inserting method, and a storage medium for inserting, in a manner selectively personalized for each subscriber, advertisement information into contents illustratively made up of moving pictures that are offered to the subscribers under a so-called pull-type distribution scheme over the Internet or similar networks. Still more particularly, the invention relates to an advertisement inserting apparatus, an advertisement inserting method, and a storage medium for selectively inserting advertisement information into contents such as moving pictures in a manner corresponding to individual advertisement insertion frames called slots having a predetermined insertion time (i.e., length) each within the contents.

BACKGROUND ART

Contents like images and music have long been distributed by content distribution services over media such as television. Some of these content distribution services are chargeable; others are offered free of charge to subscribers, with advertisement information such as commercials inserted into contents so that advertising or sponsoring fees are obtained from commercial sponsors.

Such advertising or sponsoring fees either make up business income for content providers or cover their expenses for producing contents. The sponsors generally include diverse enterprises and business entities which offer on a chargeable basis household electrical appliances, industrial goods, and other products as well as varieties of services. Having advertisement information such as commercials inserted into contents helps to draw more customers to the products and services marketed by commercial sponsors. The advertising campaign allows the sponsors to recoup benefits that will justify their expenditure on the advertisements. Although content subscribers enjoy distributed contents apparently free of charge, they may be regarded in fact as paying for the privilege by watching the advertisement information. This type of advertising business model has already found its way throughout the broadcasting and publishing industries as well as into diverse content distribution services.

Under these circumstances, there exist certain linkages between subscribers, commercial sponsors, and content providers. That is, commercial sponsors get content providers to insert advertisement information prepared to attract subscribers' interest into contents. This promotes consumption of the advertised products and services, boosting the revenues of the commercial sponsors. The sponsors pay the advertising fees, expecting to derive further income and expansion of their business from the expenditure. With their earnings thus increased, the content providers expend more in producing better contents. This advertising business model works on the assumption that advertisement information inserted into contents is actually effective.

In other words, attaching ineffective advertisement information to contents yields few benefits for the subscribers, commercial sponsors, or content providers.

Recent innovations and advances in data processing and telecommunication technologies have prompted a significant evolution of content distribution services. Traditionally, the so-called push-type content distribution services such as TV and radio broadcasting were the norm. Lately, however, pull-type content distribution services such as those utilizing wide-area networks including the Internet are gradually gaining widespread acceptance.

Illustratively, over a TCP/IP (Transmission Control Protocol/Internet Protocol) network like the Internet, there exist information-providing spaces exemplified by the WWW (World Wide Web). In such a setup, resource identification information in URL (Uniform Resource Locator) format is used to search through the information-filled space for gaining access to desired information resources described in HTML (Hyper Text Markup Language) format. Information resources of that type are viewed as home pages by the party called clients activating a WWW browser. In that setup, content providers superpose their advertisement information as "banner ads" on the home pages they run to gain advertising revenues.

Today, as network circuits such as telephone lines (asymmetric digital subscriber lines known as ADSL) and cable TV networks are getting faster in data transmission, the business prospects for image content distribution services handling moving pictures such as movies, animation films, and live broadcasts are brightening up.

One promising development is the so-called streaming technology that is starting to gain widespread use. The technology involves allowing a user to playback files even as they are being downloaded, not after completion of the download. Content distribution by streaming is considered to be the key to next-generation Internet usages. At present, well-known content distribution systems implementing the streaming technology include "RealSystem G2" and "Windows Media Technologies."

These image content distribution services are also receptive to the advertising business model. That is, advertisement information is inserted into contents so that it may be distributed at a very low cost or free of charge to far more subscribers than in the case that the contents are chargeable. This can constitute a business that benefits three parties: subscribers, content providers, and commercial sponsors. As mentioned, however, the business presupposes that advertisement information attached to contents is significantly effective.

Pull-type content-providing businesses such as Internet-based content distribution services can personalize or customize advertisement information for each subscriber before inserting the information into contents for distribution to the subscribers.

Generally, advertisement information to be distributed is selected on the basis of individual subscribers' profiles, tastes and preferences so that the subscribers are better satisfied. Typically, a content distribution system including subscribers, content providers, and commercial sponsors is organized in such a manner that in selecting specific advertisement information to be used, each of the three parties involved may have their attribute information and their requirements regarding the other two parties matched and compared for cost calculation. The benefits for the three parties from such selection of the advertisements are then studied so that the gain of the system as a whole will be maximized, with no lopsided advantages attributed to any single party.

Locations in which to insert advertisement information such as commercials within contents are called slots. The locations of such slots inside contents and the insertion time assigned to each slot are generally determined by the content provider in such a manner as to minimize any disturbing effects in the context of the offered content. The reason for that determination is that the content provider hopes to implement a framework in which to provide the best contents to subscribers under the circumstances.

Meanwhile, the lengths of advertisement information such as commercials vary from one commercial sponsor to another and from advertisement to advertisement. Given the variable duration of advertisement information, it could happen that the commercials, after being appropriately selected based on the cost calculation taking into account the attributes and requirements of the subscribers, content providers and commercial sponsors, fail to fit into the slots in contents.

If advertisement information were selected based solely on the lengths of available slots, the results would often be unproductive to the parties involved. That is, the inserted commercial could turn out to be unnecessary to the subscribers, not as effective as were hoped by the commercial sponsors, or contrary to the policy of the content providers in the context.

If advertisement information were selected based only on the outcome of the cost calculation, two things could happen. For one thing, the commercials to be inserted could overflow or fall short of available slots. For another thing, it is impossible to adequately consider the effects of repeatedly inserting the same advertisement information into one content or the scoring of commercials having different lengths (e.g., a 30-second slot is more likely be assigned two 15-second commercials than a single 30-second commercial).

Illustratively, as recent advances in the streaming technology accelerate widespread use of the advertisement distribution services customized to individual subscribers, advertisements are expected to diversify to such an extent that their volumes and types will grow explosively. Still, it is impossible to get the subscribers to watch all candidate advertisements inserted into distributed contents. What is needed is a system that calculates dynamically on how to assign advertisements to slots under existing display constraints (i.e., time constraints that apply conventionally when commercials are inserted into TV broadcasts, or display area constraints applicable when commercials are shown divided on a single screen).

DISCLOSURE OF INVENTION

It is therefore an object of the present invention to overcome the above and other deficiencies of the prior art and to provide an advertisement inserting apparatus, an advertisement inserting method, and a storage medium for properly inserting advertisement information into contents such as moving pictures that are distributed over a wide-area network such as the Internet.

It is another object of the present invention to provide an advertisement inserting apparatus, an advertisement inserting method, and a storage medium for inserting, in a manner selectively personalized for each subscriber, advertisement information into contents such as moving pictures that are offered to the subscribers under a pull-type distribution scheme over the Internet or similar networks.

It is a further object of the present invention to provide an advertisement inserting apparatus, an advertisement inserting method, and a storage medium for selectively inserting advertisement information into contents such as moving pictures in a manner corresponding to individual advertisement insertion frames called slots having a predetermined insertion time (i.e., length) each within the contents.

It is an even further object of the present invention to provide an advertisement inserting apparatus, an advertisement inserting method, and a storage medium for calculating dynamically on how to assign advertisement information to slots under existing display constraints (i.e., time constraints in effect conventionally when commercials are inserted into TV broadcasts, or display area constraints that apply when commercials are shown divided on a single screen).

In achieving the foregoing and other objects of the present invention and according to a first aspect thereof, there is provided an advertisement inserting apparatus or method for selecting advertisement information from a plurality of candidate advertisements having a cost value each for insertion into a slot in a content, the advertisement inserting apparatus or method including: a selection condition establishing means or step for establishing an objective function and a constraint expression as selection conditions, the objective function being used to maximize a total of cost values held by the advertisements to be inserted into the slot, the constraint expression for equalizing totaled lengths of the advertisements to be inserted with a length of the slot; and an advertisement information selecting means or step for selecting the advertisement information to be inserted into the slot from the plurality of candidate advertisements by solving the established selection conditions using linear programming.

Where advertisement information such as commercials is inserted into contents distributed illustratively by the moving picture streaming technology, the advertisement information to be inserted is selected in such a manner as to maximize the satisfaction of at least one of the three parties involved: content providers, subscribers, and commercial sponsors. If the time period of a given slot (advertisement insertion frame) is determined beforehand, however, it may not be possible to assign to the slot in question advertisement information that is deemed effective.

That snag is bypassed by the advertisement inserting apparatus or method according to the first aspect of the invention, whereby an objective function and a constraint expression are established as selection conditions, the objective function being used to maximize a total of cost values held by the advertisements to be inserted into the slot, the constraint expression for equalizing totaled lengths of the advertisements to be inserted with the length of the slot. The advertisement information to be inserted into the slot is then selected from multiple candidate advertisements by solving the established selection conditions (objective function and constraint expression) as an assignment problem of mathematical programming, i.e., based on linear programming. The advertisement information thus selected is inserted into the predetermined slot so as to bring about the highest possible benefits for the parties concerned.

The above-mentioned cost value of advertisement information refers to a value representative of the degree of satisfaction for an entire system having an information-providing space made up of content providers providing contents, of commercial sponsors offering advertisement information to be attached to the contents, and of subscribers viewing the contents. In that information-providing space, the attribute information specific to the content providers, commercial sponsors, and subscribers is compared with the requirements of each of the three parties regarding the selection of advertisements. From the comparison derives a value representing the degree of satisfaction of each of the parties. That value is utilized as a cost value in selecting suitable advertisement information from candidate advertisements.

The larger the number of shorter advertisements selected for assignment, the greater the value of the objective function established by the selection condition establishing means or step above. That is, if the assignment problem were solved simply by integer programming, only short advertisements could be selected, which is not desirable. Given such a probability, the advertisement inserting apparatus or method according to the first aspect of the invention may preferably include a cost value scoring means or step for scoring the cost value depending on the length of advertisement information. This preferred variation makes it possible for longer advertisements to be as likely selected as shorter ones.

Distributed contents such as moving pictures generally include a plurality of slots each. In such cases, the same advertisement information may be allowed to appear a plurality of times in a single content to enhance the advertising effect for a specific commercial sponsor. This feature may be implemented by the advertisement inserting apparatus or method according to the first aspect of the invention preferably including an expanded redefining means or step for redefining the same advertisement information as a different candidate advertisement as many times as a repeatable insertion count of the advertisement in question. This makes it possible to insert the same advertisement information a plurality of times into a single content.

However, it can be counterproductive to repeat excessively the same advertisement information within a single slot for supposedly enhanced advertising effect because such repetition can bore or annoy the subscribers. This snag can be averted by preferably supplementing the selection conditions established by the selection condition establishing means or step above with a restricting condition for inhibiting the same advertisement information allowed to appear repeatedly from appearing more than once in the same slot.

It is also possible to rearrange the expanded redefining means or step above in such a manner as to reduce the score of the cost value of any redefined candidate advertisement so that the same advertisement information will not be selected preferentially for repeated insertion.

It might also happen that the number of candidate advertisements is smaller than the number of available slots in a content. In such a case, the processing could be aborted, given that not all slots are filled with advertisements and the assignment problem cannot be solved by integer programming. It is the case where the slots should be assigned as many advertisements as are available, with the unfulfilled slots left empty. That arrangement is desirable from a profitability point of view, i.e., for the benefit of the distribution business as a whole.

In view of the eventuality above, the advertisement inserting apparatus or method according to the first aspect of the invention may preferably include a means or step for judging whether the number of candidate advertisements is at least the same as the number of slots before solving the assignment problem, so that if the candidate advertisement count is judged to fall short of the slot count, then the assignment problem is solved for each of the slots.

Where the advertisement information assignment problem is solved by integer programming, the calculation time tends to be longer the larger the number of candidate advertisements. In particular, if there is advertisement information allowed to be inserted repeatedly, expanded redefinition of variables takes place. That is, the variables to be calculated for expanded redefinition increases progressively.

Given that eventuality, the advertisement inserting apparatus or method according to the first aspect of the invention may preferably include a means or step for solving the integer programming problem regarding each slot and using the solution to the problem as a basis for generating a set of candidate advertisements, so that the advertisement information to be inserted into each slot may be selected from the set of candidate advertisements with the repeatable insertion count of each advertisement in the set taken into consideration, whereby the variables involved are reduced. Solving the integer programming problem for each slot in order to create a set of candidate advertisements narrows the candidates down to the advertisement information which turns out to be effective and which has already been assigned to the length of each slot. This arrangement allows for a minimum of deterioration in the accuracy of optimum assignment as opposed to cases where the assignment problem is to be solved for all candidate advertisements.

According to a second aspect of the invention, there is provided a storage medium which stores physically, in a computer-readable format, computer software for causing a computer system to select advertisement information from a plurality of candidate advertisements having a cost value each for insertion into a slot in a content, the computer software including the steps of: a selecting conditions establishing step for establishing an objective function and a constraint expression as selection conditions, the objective function being used to maximize a total of cost values held by the advertisements to be inserted into the slot, the constraint expression for equalizing totaled lengths of the advertisements to be inserted with the length of the slot; and an advertisement selecting step for selecting the advertisement information to be inserted into the slot from the plurality of candidate advertisements by solving the established selection conditions using linear programming.

The storage medium according to the second aspect of the invention is any one of storage media that offer computer software in a computer-readable format illustratively to a general-purpose computer system capable of executing diverse program codes. Such storage media typically include CDs (compact discs), FDs (flexible discs), MOs (magneto-optical discs), and other portable media that are readily mounted and discounted. As another alternative, it is technically possible to transmit computer software to a specific computer system over transmission media such as networks (which may be wired or wireless).

The storage medium is arranged so as to define its structurally or functionally collaborative relations with computer software that causes a computer system to implement specific functions. In other words, when relevant computer software is installed into the computer system via the storage medium according to the second aspect of this invention, the computer system operates in collaboration with the installed software to provide the same effects as those of the advertisement inserting apparatus and method according to the first aspect of the invention.

Other objects, features and advantages of the invention will become more apparent upon a reading of the following description and appended drawings.

BRIEF DESCRIPTION OF DRAWINGS

FIG. 8 is a view showing detailed data for use in matching by the advertisement selecting server 40;

FIG. 9 is a flowchart of steps carried out by a rule unit 41 of the advertisement selecting server 40;

FIG. 11 is a tabular view indicating relations between matching types on the one hand and cost allocations on the other hand;

FIG. 15 is a schematic view illustrating how second-time and subsequently selected candidates have their score reduced in cost recalculations so that the same advertisement information will not appear preferentially;

FIG. 16 is a schematic view giving results (specific example) of processing performed by an MP unit 42 in phase 2;

FIG. 20 is a schematic view indicating how the candidate advertisement assignment problem is solved for each slot using integer programming;

BEST MODE FOR CARRYING OUT THE INVENTION

Preferred embodiments of this invention will now be described in detail with reference to the accompanying drawings.

A. System Configuration

Figure 1:
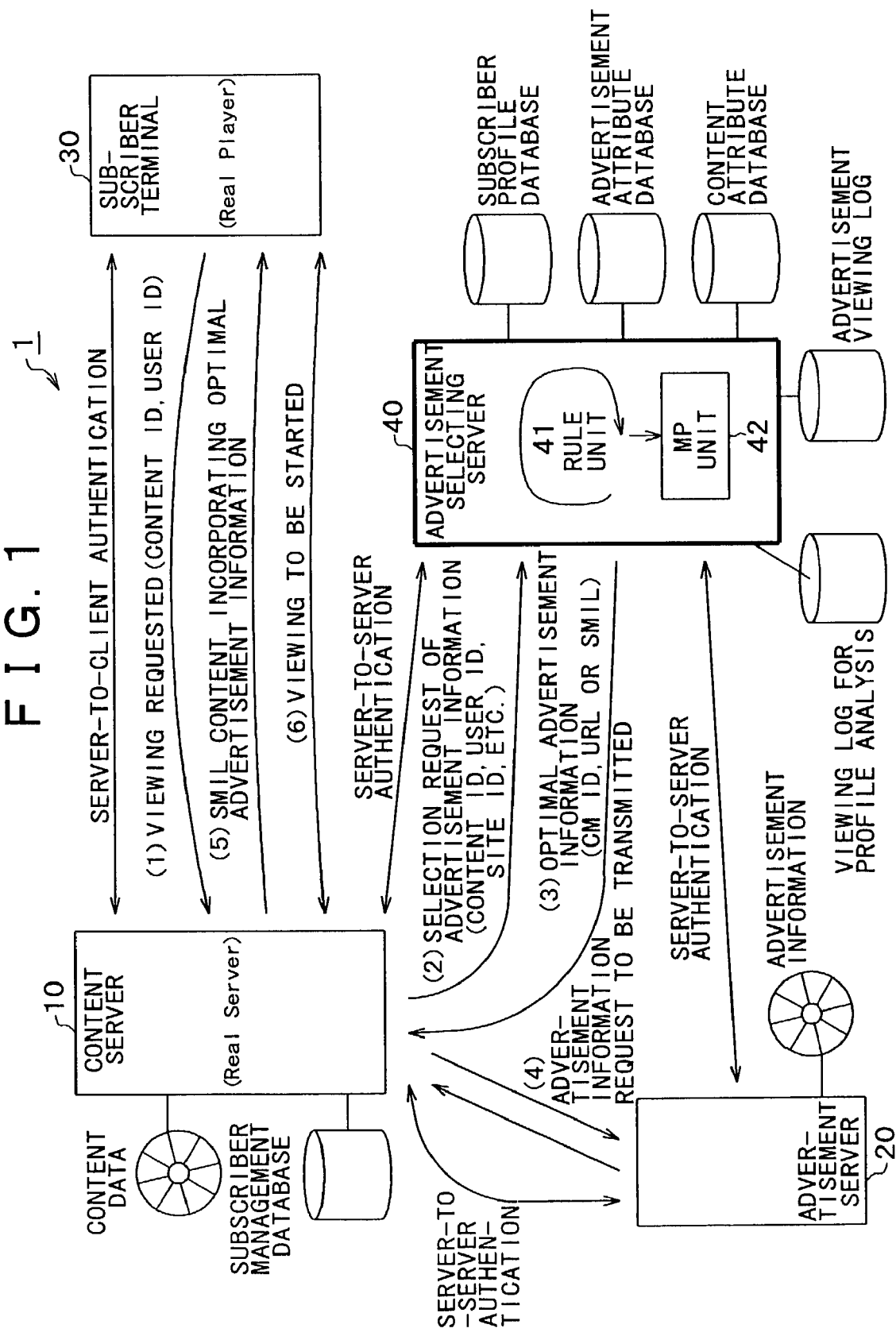
FIG. 1 is a schematic view showing a configuration of a content/advertisement providing system 1 according to the invention.

FIG. 1 schematically shows a configuration of a content/advertisement providing system 1 embodying the invention. The system 1 distributes illustratively image contents made up of moving pictures to subscribers over a wide-area network such as the Internet together with personalized advertisement information targeted for the subscribers.

As illustrated in FIG. 1, the content/advertisement providing system 1 is constituted by a content server 10, an advertisement server 20, a subscriber terminal 30, and an advertisement selecting server 40. The content server 10 is run by a content provider offering a content distribution service involving the distribution of contents such as images. The advertisement server 20 is operated by a commercial sponsor offering accumulated advertisement information to be inserted into contents for distribution. The subscriber terminal 30 is owned by a subscriber viewing distributed contents. The advertisement selecting server 40 is run by an advertisement selection business operator offering a personalized advertisement selection service involving the selection of advertisement information to be inserted into contents for distribution.

In the description that follows, the content provider, commercial sponsor, subscriber, and advertisement selection business operator taking part in the content/advertisement providing system 1 will also be referred to as the players where appropriate.

The server machines 10, 20 and 40 may each be implemented illustratively by starting up a suitable server application program on a workstation (WS) or a personal computer (PC). The subscriber terminal 30 may be implemented illustratively by booting a client application program such as a Web browser on the personal computer.

The server and client machines are connected to a TCP/IP network such as the Internet through physical connecting means such as the Ethernet (registered trademark). The machines are interconnected securely through appropriate authenticating procedures.

The subscriber terminal 30 is connected to the content server 10 via the network. By operating the subscriber terminal 30, the subscriber may designate contents such as moving pictures to be provided by the content server 10. Where the content server 10 incorporates streaming techniques such as RealServer and where the subscriber terminal 30 has moving picture playback software such as RealPlayer installed therein, the subscriber is able to watch and listen to the requested content in real time.

The content server 10 is also connected to the advertisement server 30 and advertisement selecting server 40 via the network. In this setup, the content server 10 can issue an advertisement selection request to the connected servers, i.e., a request for advertisement information to be inserted into the content requested by the subscriber for distribution. The advertisement information selected by and returned from the advertisement selecting server 40 is acquired from the advertisement server 20 and inserted into the content, whereby the advertisement in question is exposed on the subscriber terminal 30.

The content server 10 of this invention also has the function of detecting advertisement information being exposed on the subscriber terminal 30. Upon advertisement exposure, the content server 10 transmits an advertisement viewing log to the advertisement selecting server 40. Illustratively, suitable plug-in software may be installed into the content server 40 so as to implement on the server 40 such extended functions as the request for selection of advertisements and the transmission of advertisement exposure logs.

The advertisement selecting server 40 is connected via the network to various databases such as those of subscriber profiles, advertisement attributes, and content attributes. Upon receipt of an advertisement selection request from the content server 10, the advertisement selecting server 40 selects advertisement information to be exposed along with contents in keeping with the details of the request and based on what is available from the databases. When receiving an advertisement exposure log from the content server 10, advertisement selecting server 40 stores the received log into a database as part of an advertisement viewing history.

The advertisement selecting server 40 is implemented using a workstation or a personal computer capable of running a server application "Weblogic Server." Software for processing advertisement selection requests and storing advertisement exposure logs may be described illustratively in Java.

The databases for accumulating subscriber information (tastes, preferences, ages, addresses), advertisement attributes (for subscriber targeting), content attributes (information about preferential advertisements), etc., may be implemented illustratively using a workstation (WS) or a personal computer (PC) capable of running Oracle, i.e., a relational database (RDB) system.

Figure 2:
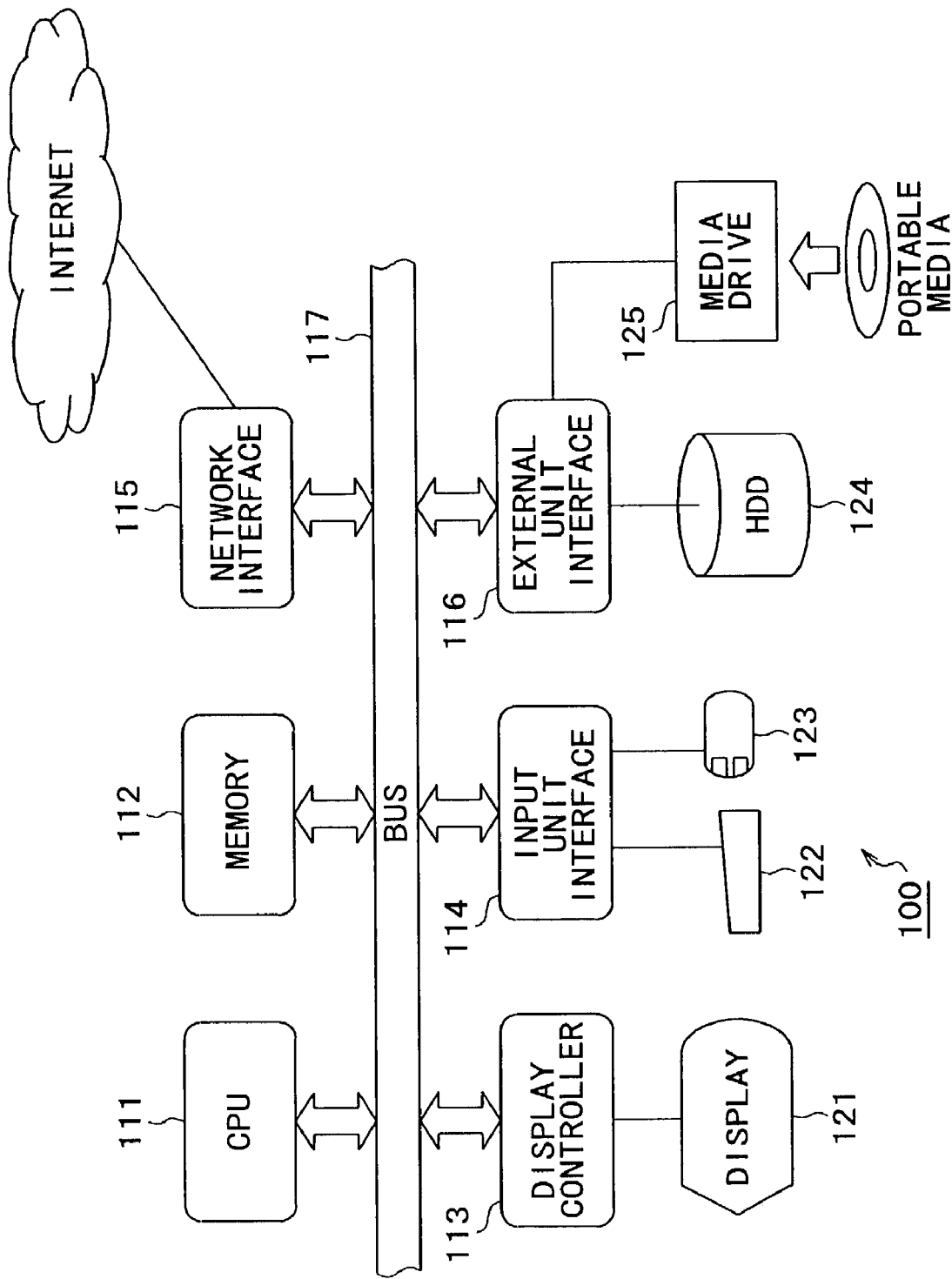
FIG. 2 is a schematic view depicting a structure of a computer system that may be used as a server or a client.

What follows is a description of a computer system that can constitute a host terminal acting as any of the servers 10, 20 and 40 catering to their clients. FIG. 2 schematically illustrates a typical hardware configuration of this computer system 100.

A CPU (central processing unit) 111, main controller of the system 100, performs various application programs under control of an operating system (OS). Illustratively, when the CPU 111 executes a server application for providing contents, a server application for providing advertisement information, a server application for selecting advertisement information to be inserted into contents, or a client application for viewing contents, the system 100 functions as the server 10, 20, 40, or subscriber terminal 30, respectively.

As shown in FIG. 1, the CPU 111 is interconnected with other component devices (to be described later) via a bus 117. The devices on the bus 117 are each given a unique memory address or I/O address. These addresses allow the CPU 111 to access the corresponding devices. The bus 117 is typically a PCI (Peripheral Component Interconnect) bus.

A memory 112 is a storage device that temporarily accommodates program codes being executed or work data being handled by the CPU 111. The memory 112 in FIG. 2 embraces a volatile and a nonvolatile memory.

A display controller 113 is a dedicated controller for actually processing graphics-drawing instructions issued by the CPU 111. Illustratively, the controller 113 supports bit-mapped graphics-drawing functions compatible with SVGA (Super Video Graphic Array) or XGA (extended Graphic Array) norms. Graphic data processed by the display controller 113 are written temporarily to a frame buffer (not shown) before being output onto a display unit 121. The display unit 121 is illustratively a CRT (cathode ray tube) display or an LCD (liquid crystal display).

An input unit interface 114 is designed to interface user input units such as a keyboard 122 and a mouse 123 to the system 100. As will be described later, it is necessary to enter various items of attribute information into the content providing server 10 regarding contents, into the advertisement providing server 10 about advertisement information, and into the subscriber terminal 30 with respect to the subscriber, along with requirements (OPTINOUT information) for advertisement selection. The computer system 100 allows settings of these items to be input through the keyboard 122 and mouse 123. The detailed settings of the items making up the attribute information about contents, advertisement information and subscriber, as well as the requirements (OPTINOUT information) regarding the selection of advertisements, will be discussed later.

A network interface 115 is designed to interface the system 100 to a network such as a LAN (local area network) in accordance with suitable communication protocols like the Ethernet (registered trademark). Generally, the network interface 115 is furnished in the form of a LAN adapter card that is inserted into a PCI bus slot on a motherboard (not shown). Alternatively, the system 100 may be connected to an external network not through the network interface but via a modem (not shown).

On the LAN, a plurality of host machines (computers) are connected in a transparent manner constituting a distributed computing environment. Part of the host machines operate as routers connected to external networks such as other LANs and the Internet. Over the Internet, software programs and data contents are distributed through the routers.

It is assumed for this embodiment that contents and advertisement information to be inserted into the contents are distributed over the network. Illustratively, the content server 10 distributes contents such as moving pictures to subscriber terminals by streaming technology.

The attribute information set for contents, for advertisement information and for subscribers, along with the requirements (OPTINOUT information) regarding the selection of advertisements, may be moved between systems over the network. On the computer system working as the advertisement selecting server 40, the attribute information set for contents, advertisement information and subscribers together with the requirements (OPTINOUT information) regarding advertisement selection is stored in databases. When a subscriber requests a certain content, the advertisement information to be inserted into the requested content is selected by matching process involving these databases in a manner maximizing the benefits for the content/advertisement providing system 1 as a whole (as will be discussed later). The advertisement selecting server 40 can report the result of the advertisement information selection to other host terminals such as the content server 10 and advertisement server 30 over the network.

An external unit interface 116 is designed to interface external units such as a hard disc drive (HDD) 124 and a media drive 125 to the system 100. The external unit interface 116 complies illustratively with such interface standards as IDE (Integrated Drive Electronics) and SCSI (Small Computer System Interface).

The HDD 124 is a known external storage unit that has magnetic discs mounted in fixed fashion as storage media. The HDD 124 is superior to other external storage devices in terms of storage capacity and data transfer speed. When a software program is placed onto the HDD 126 in an executable manner, the program is said to be "installed" into the system. Usually, the HDD 124 accommodates in nonvolatile fashion the program codes of the operating system to be executed by the CPU 111, as well as application programs and device drivers.

For example, the content server application program, advertisement server application program, advertisement selection server application program, and subscriber terminal client application program of this embodiment are installed on the HDD 124. The HDD 124 may also accumulate the attribute information established with respect to contents, advertisement information, and subscribers, along with the requirements (OPTINOUT information) regarding the selection of advertisements. The advertisement selecting server 40 may record onto the HDD 124 an advertisement viewing history made up of advertisement exposure logs detailing the advertisements having been exposed to the subscribers.

The media drive 125 is a device which, when loaded with portable media including the CD (compact disc), MO (magneto-optical disc) and DVD (digital versatile disc), gains access to their data recorded surfaces. The portable media are used primarily for the backup of software programs and data files in a computer-readable format, as well as for moving these resources between systems (e.g., for marketing and distribution).

Illustratively, the content server application program, advertisement server application program, advertisement selection server application program, and subscriber terminal client application program of this embodiment may be distributed using such portable media. Furthermore, the portable media may be used to distribute the attribute information established with regard to contents, advertisement information, and subscribers, along with the requirements (OPTINOUT information) relative to the selection of advertisements. Obviously, moving picture contents carrying personalized advertisement information targeted for individual subscribers may also be placed on this type of storage media for movement between systems, instead of being distributed by streaming from the content server 10.

The computer system 100 in FIG. 2 is typically a PC/AT (Personal Computer/Advanced Technology) compatible computer or its successor. A computer system having a different architecture may also be utilized as a host terminal of this embodiment.

B. Personalized Content Distribution Service

The content/advertisement providing system 1 shown in FIG. 1 provides advertisement-carrying contents to the subscriber terminal 30 in the following steps:

(1) The subscriber terminal 30 makes a content-viewing request to the content server 10.

(2) The content server 10 requests the advertisement selecting server 40 to select advertisement information to be inserted into the requested content.

(3) The advertisement selecting server 40 selects advertisement information deemed optimal through the process of matching the subscriber's profile with advertisement and content attributes (to be described later), and notifies the requesting content server 10 of the selected information.

(4) The content server 10 acquires the optimal advertisement information from the advertisement server 20.

(5) The content server 10 inserts the acquired optimal advertisement information into the content designated by the subscriber terminal 30, and distributes the content to the subscriber terminal 30 in SMIL (Synchronized Multimedia Integrated language) format.

(6) The designated moving picture content is playbacked in real time on the subscriber terminal 30.

The SMIL (Synchronized Multimedia Integrated language), worked out and established by W3C (WWW Consortium), is an integrating technology for displaying independent multimedia objects in a synchronized manner. Data written in SMIL format can describe the temporal behavior in audiovisual multimedia presentations and presentation layouts on the screen.

When the subscriber selects the content, the advertisement selecting server 40 coordinates the interests of the subscriber, content provider, commercial sponsor, and advertisement selection business operator before selecting a suitable advertisement from the group of advertisement information stored in the advertisement server 20.

Figure 3:
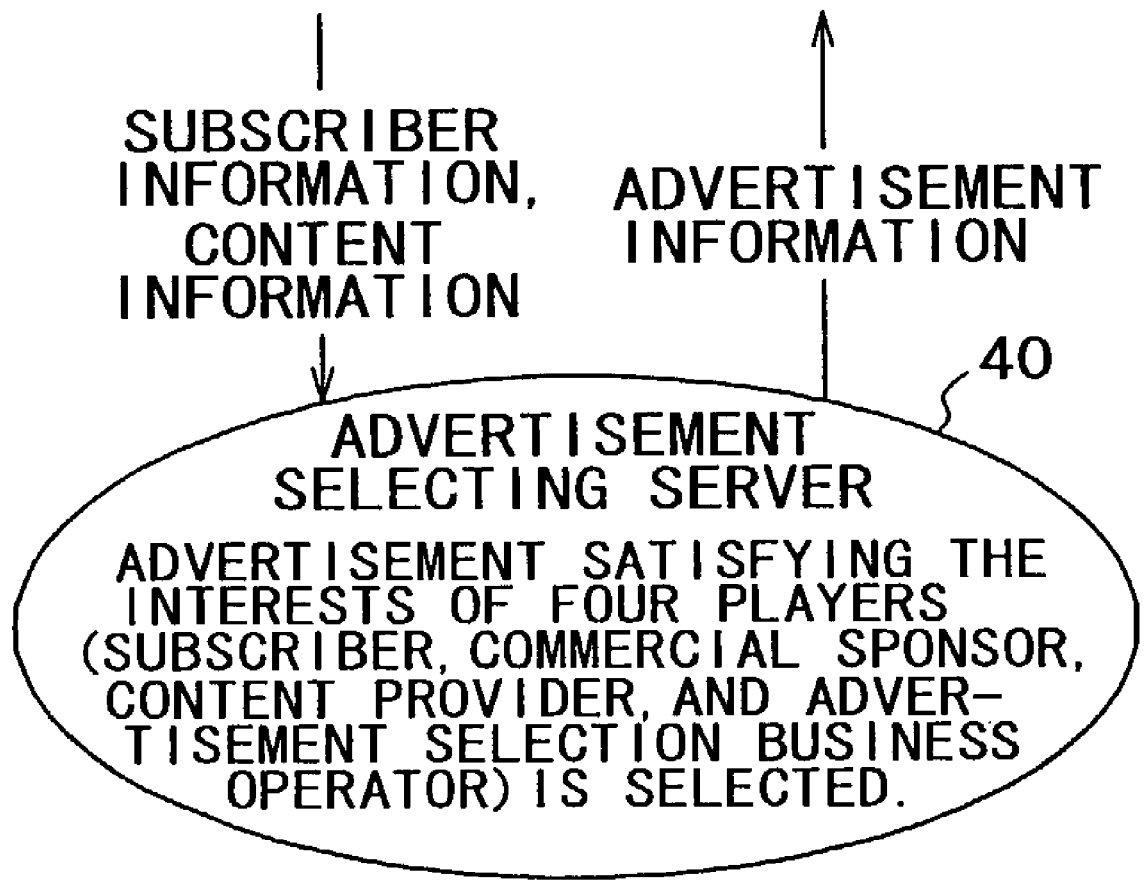
FIG. 3 is a conceptual view of an advertisement selecting server 40.
Figure 4:
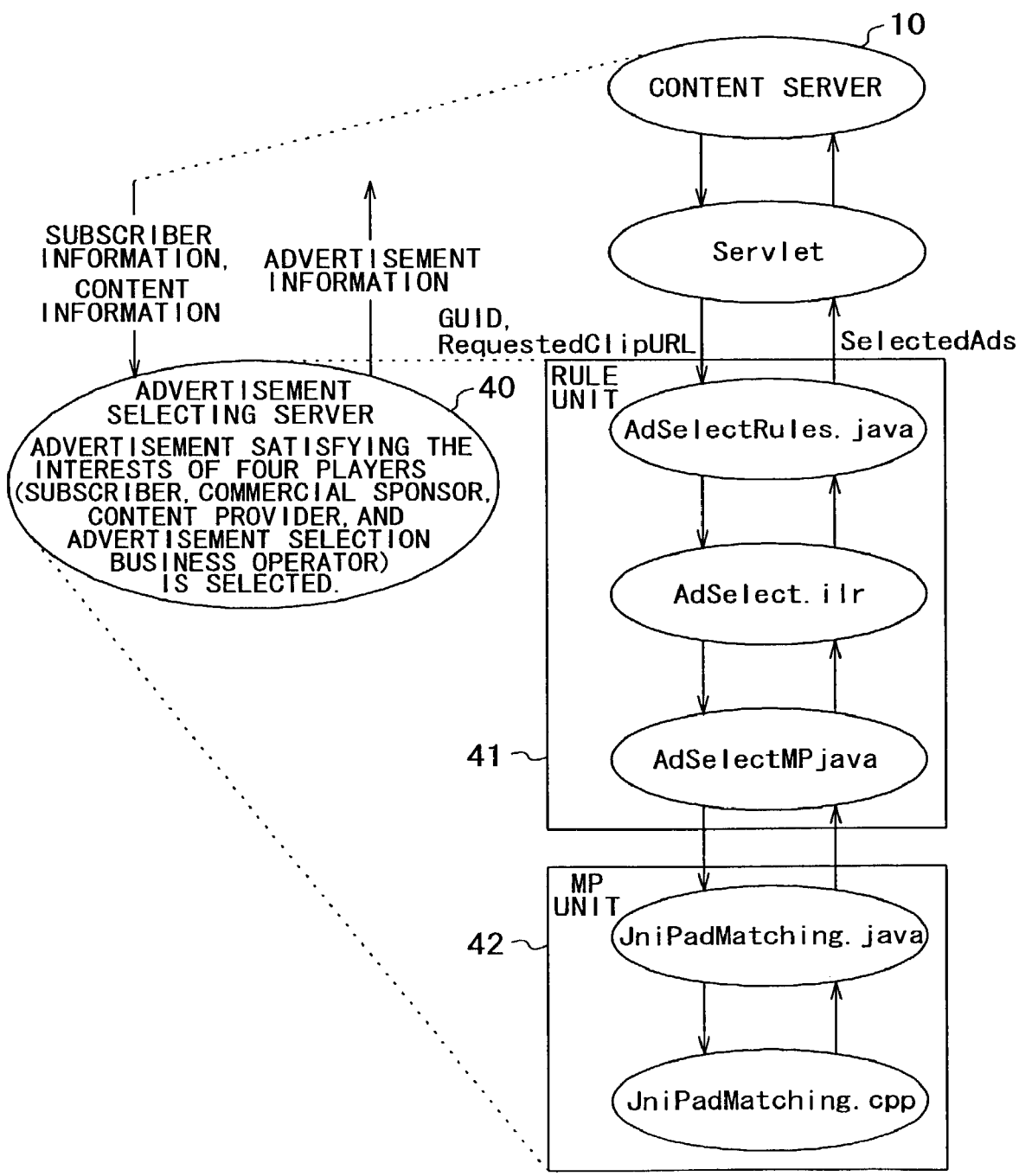
FIG. 4 is a schematic view illustrating a structure of mounted modules in the advertisement selecting server 40 according to the invention.

FIGS. 3 and 4 give conceptual views of the advertisement selecting server 40. This server is constituted by a rule unit 41 and an MP (mathematical programming) unit 42.

The rule unit 41 verifies restrictions on the matching between the attributes of the players involved and their advertisement selection requirements on the other hand (i.e., extraction of candidate advertisements) The unit 41 also performs cost allocation of candidate advertisements. The MP unit 42 narrows down candidate advertisements through a linear programming problem, and calculates assignment of candidate advertisements to a slot through an integer programming problem.

With this embodiment, the advertisement selecting server 40 performs comparisons (also called matching hereunder), between the players, of their attribute information and their guidelines or requirements (called OPTINOUT information) regarding the selection of advertisement information. The server 40 selects advertisements based on the result of the matching.

FIG. 4 is a schematic view illustrating a structure of mounted modules in the advertisement selecting server 40 according to the invention. As shown FIG. 4, the rule unit 41 is constituted by modules called AdSelectRules.java, AdSelect.ilr, and AdSelectMP.java.

The AdSelectRules.java module receives an advertisement selection request from a Servlet module outside and gives a response to the request. The AdSelectRules.java module also loads objects needed for matching into a work area of memory, and starts up a rule engine.

The AdSelect.ilr module is made up of a plurality of rules. They make up a rule set which selects candidate advertisements by taking into account matching-based restrictions and inhibiting conditions and which performs cost allocation of the candidate advertisements.

The AdSelectMP.java module generates information (such as customized cost allocation and advertisement lengths) to be handed over to the MP unit 42. The AdSelectMP.java module also starts up processing of the MP unit 42 and acquires the result of that processing.

The MP unit 42 is constituted by modules called JniPadMatching.java and JniPadMatching.cpp.

The JniPadMatching.java module acts as a JNI Wrapper that invokes a C++native class (JniPadMatching.cpp) for carrying out processing based on MP (mathematical programming).

The JniPadMatching.cpp module performs actual processes through the use of mathematical programming.

With this embodiment of the invention, the players involved have attribute information specific to each player, or selection guidelines (OPTINOUT information) describing the guidelines or requirements allowing each player to select the other players; or the players have both the attribute information and the selection guidelines each. Some players may have the OPTINOUT information that is the same as their own attribute information.

Attribute information and OPTINOUT information are made up of a plurality of items. In the advertisement selecting server 40, the rule unit 41 matches the corresponding items between the attribute information about one player and the OPTINOUT data about other players regarding the selection of advertisements.

The attribute information constitutes data that represent the attributes of contents, advertisements, and subscribers. The information is constituted by a plurality of items. The degree of matching between the items is graded in numbers ranging from 0 to 1.0. In particular, attribute data items that have only two alternatives each (e.g., male or female) are expressed by a number 1 for matching and by 0 for mismatching.

The OPTINOUT data denote guidelines or requirements regarding the selection of advertisements, and are made up of a plurality of items constituting master data, to be described later. Each of the items is graded in numbers with respect to one of four types of attributes: restricting, preferring, inhibiting, or grading, as described below. In the case that OPTINOUT data are expressed in terms of numbers, each of the items making up the data are graded in numbers ranging from −1.0 to 1.0.

Restricting attribute type: if the condition is met, the advertisement is selected exclusively.

Preferring attribute type: if the condition is met, the advertisement is selected not exclusively but preferentially (i.e., selected at least once).

Inhibiting attribute type: if the condition is met, the advertisement is not selected.

Grading attribute type: the degree of preference for the condition is graded in numbers.

The rule unit 41 selects advertisement information based on the result of matching between attribute information and OPTINOUT data. The content/advertisement providing system 1 of this embodiment carries out the following four major types of matching (see FIG. 5):

Matching 1 (M1): compares advertisement attributes with content OPTINOUT data.

Matching 2 (M2): compares content attributes with advertisement OPTINOUT data.

Matching 3 (M3): compares subscriber attributes and subscriber OPTINOUT data, with advertisement OPTINOUT data.

Matching 4 (M4): compares advertisement attributes with subscriber OPTINOUT data.

Figure 5:
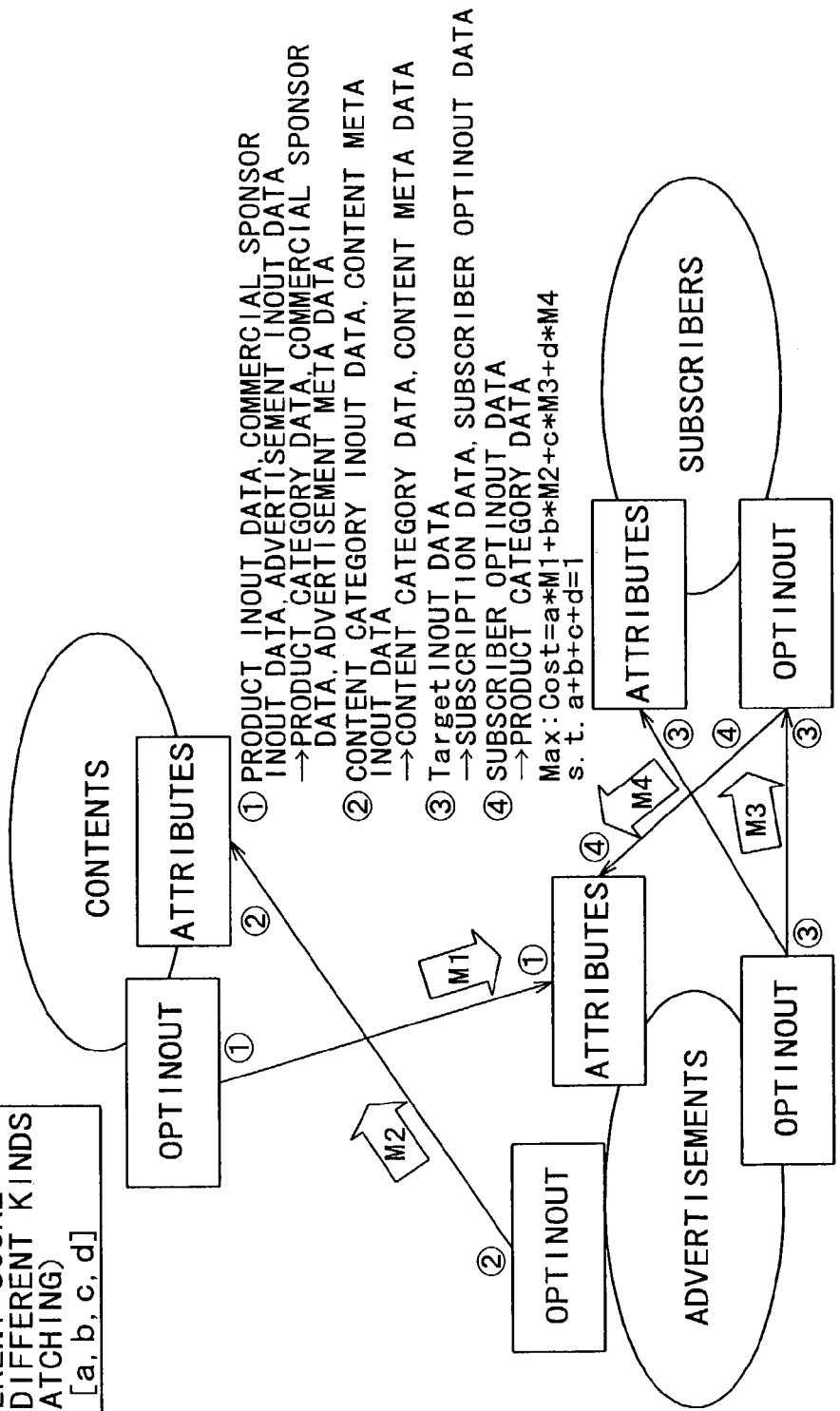
FIG. 5 is a schematic view indicating how matching is done by the content/advertisement providing system 1 of the invention.

As shown in FIG. 5, part of matching 3 involves comparing advertisement OPTINOUT data with subscriber OPTINOUT data. In fact, the actual process considers the subscriber OPTINOUT data to be part of the subscriber attributes.

The four types of matching yield cost allocation for each type. The allocated cost components are scored to reflect the advertisement selection business operator's policy. More specifically, a scoring factor is allotted to each type of matching when the different types of matching are carried out (using the formula below), whereby a definitive cost allocation is generated for a candidate advertisement:

$$Cost = a \times M1 + b \times M2 + c \times M3 + d \times M4$$

(where, a+b+c+d=1)

C. Data for Use in Selecting Advertisements

What follows is a detailed description of data used for matching between the players. Because the data for matching by the rule unit 41 and the data entered by each player through a host terminal differ slightly in format, the data to be entered by the players will be discussed first.

Subscriber Attribute Data

The attribute data about each subscriber are composed of subscriber data including: sex, date of birth, country of residence, area of residence, ZIP code for place of residence, ID for country of employment, ID for area of employment, ZIP code for area of employment, mother tongue, knowledge of foreign languages, job ID, annual income ID, marital status, residence ID, and family structure. The subscriber attribute data are to be matched with TargetINOUT data, i.e., advertisement OPTINOUT information.

Subscriber OPTINOUT Data

The subscriber OPTINOUT data are constituted by the items furnished as master data (M_OPT). The requirement for each of the items regarding the subscriber in question is described either as an inhibiting type or as a grading type. If the description is of grading type, the item in question is graded in numbers ranging from −1.0 to 1.0 according to the matching degree of the subscriber. The subscriber OPTINOUT data are to be matched with TargetINOUT data (i.e., advertisement OPTINOUT data) and product category data.

Figure 6:
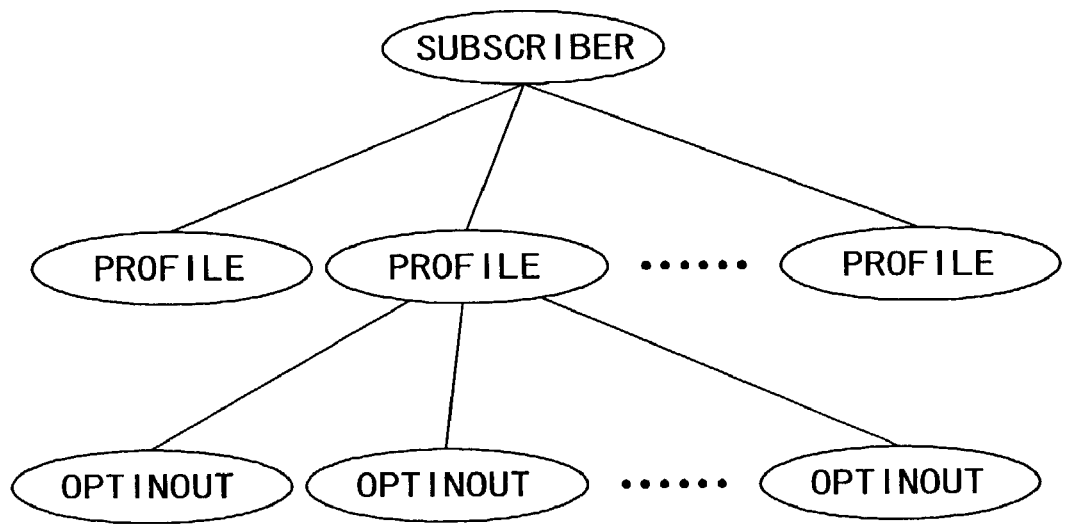
FIG. 6 is a schematic view sketching a data structure of subscriber OPTINOUT data.

Each subscriber is allowed to have a plurality of profiles by preparing a plurality of sets of subscriber data for different uses or situations, such as for home use and for use at work. With regard to each profile, the subscriber may input each of the items constituting the subscriber OPTINOUT data. That means the subscriber OPTINOUT data have a data structure such as one shown in FIG. 6.

The subscriber attribute information and subscriber OPTINOUT information are input by each subscriber subscribing to the content/advertisement providing system 1. The data input is done by all subscribers through their own subscriber terminals 30.

Advertisement Attribute Information

The attribute information about each advertisement is made up of advertisement meta data, commercial sponsor category data, and product category data.

The advertisement meta data are constituted by an advertisement ID for uniquely identifying each advertisement, and the advertisement meta data are to be matched with advertisement INOUT data, i.e., content OPTINOUT information.

The commercial sponsor category data describe the IDs of the commercial sponsors involved with the advertisement information in question. There exist what may be called joint advertisements representing advertisement information from a plurality of commercial sponsors. The advertisements are each graded in numbers ranging from 0 to 1.0 reflecting the degree of participation by each of the sponsors involved. The commercial sponsor category data are to be matched with commercial sponsor OPTINOUT data, i.e., content OPTINOUT information.

The product category data are made up of the items furnished as the above-mentioned master data (M_OPT). Attribute information about each product category regarding the advertisement information in question is graded in numbers. As such, the product category data are to be matched with product INOUT data, i.e., content OPTINOUT information.

Advertisement OPTINOUT Information

The OPTINOUT information about each advertisement is composed of content meta INOUT data, content category INOUT data, and TargetINOUT data.

The content meta INOUT data designate the requirements for the advertisement information applicable to each of the contents supplied by the content provider. Specifically, the data describe the requirements in a restricting, inhibiting, or grading manner with regard to a content ID unique to each content. If the description is of grading type, the requirements are each graded in numbers ranging from −1.0 to 1.0. The content meta INOUT data are to be matched with the advertisement meta data (advertisement IDs).

The content category INOUT data designate the requirements (i.e., OPTINOUT) for the content categories about the advertisement information in question. The items furnished as the master data (M_CONTENT_CATEGORY) have their requirements described in a restricting, inhibiting, or grading manner. If the description is of grading type, each item is graded in numbers ranging from −1.0 to 1.0. The content category INOUT data are to be matched with the commercial sponsor category data.

The TargetINOUT data designate the requirements (i.e., OPTINOUT) for the subscriber viewing the advertisement information in question. The items provided as the master data (M_TARGET) have their requirements described in a restricting, inhibiting, or grading manner. The TargetINOUT data are to be matched with the subscriber data (subscriber attribute information) and subscriber OPTINOUT data.

Figure 7:
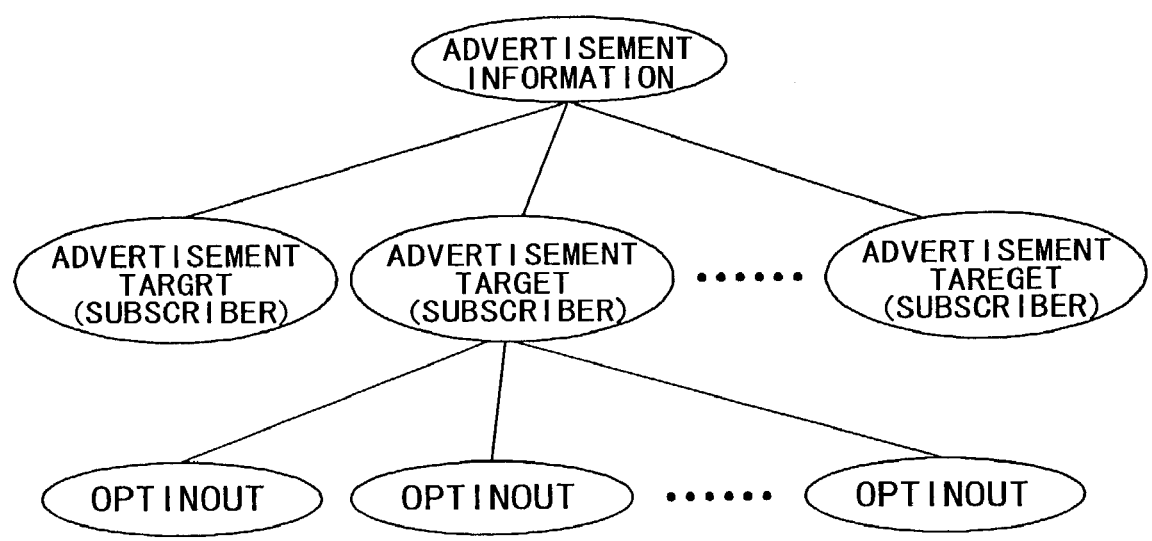
FIG. 7 is a schematic view depicting a data structure of TargetINOUT data.

With this embodiment of the invention, each piece of advertisement information can be targeted for a plurality of subscribers. Each advertisement target may have TargetINOUT data whose items are allowed to be input. The advertisement OPTINOUT data are thus given a data structure such as one shown in FIG. 7.

Because the content/advertisement providing system 1 of this embodiment allows a single piece of advertisement information to be viewed by a plurality of subscribers simultaneously, the advertisement selecting server 40 performs matching processes on a subscriber-by-subscriber basis. The MP unit 42 (to be described later) is designed to skip advertisement targets applicable to the same advertisement information. That is, the AND relation exists between items of the OPTINOUT information established within the same advertisement target, whereas the OR relation is in effect between items of the OPTINOUT information set for different advertisement targets.

The advertisement attribute information and OPTINOUT information may be input in units of advertisements illustratively through the advertisement server 20 or 40, or through terminal equipment connected to such servers, by the commercial sponsor distributing advertisement information by use of the content/advertisement providing system 1.

Content Attribute Information

The content attribute information is composed of content meta data and content category data.

The content meta data constitute a content ID for uniquely identifying each content, and the content meta data are to be matched with the content meta OPTINOUT data, i.e., advertisement OPTINOUT information.

The content category data designate the category of the content in question. Specifically, the data describe an attribute value for each of the items making up the above-mentioned master data (M_CONTENT_CATEGORY), the value being graded in numbers ranging from 0 to 1.0. As such, the content category data are to be matched with the content category OPTINOUT data (advertisement OPTINOUT information).

Content OPTINOUT Information

The content OPTINOUT information is made up of advertisement INOUT data (content→advertisement), commercial sponsor INOUT data (content→advertisement) and product INOUT data (content→advertisement).

The advertisement INOUT data designate the requirements (OPTINOUT information) for each piece of advertisement information regarding the content in question. Specifically, the data describe, in a restricting, preferring, inhibiting, or grading manner, each of the items constituting the advertisement information provided by the advertisement server 20, i.e., advertisement meta data (advertisement IDs). If the description is of grading type, each item is graded in numbers ranging from −1.0 to 1.0. The advertisement INOUT data are to be matched with the advertisement meta data (advertisement attribute information).

The advertisement INOUT data designate the requirements (OPTINOUT) for each of the commercial sponsor categories applicable to the content in question. Specifically, the data describe, in a restricting, preferring, inhibiting, or grading manner, each of the items furnished as the master data (M_CUSTOMER). The advertisement INOUT data are to be matched with the commercial sponsor category data (advertisement OPTINOUT information).

The product INOUT data designate the requirements (OPTINOUT) for each of the product categories applicable to the content in question. Specifically, the data describe, in a restricting, preferring, inhibiting, or grading manner, the requirements for each of the items furnished as the master data (M_OPT). If the description is of grading type, each item is graded in numbers ranging from −1.0 to 1.0. The product INOUT data are to be matched with the product category data (advertisement attribute information).

The content attribute information and OPTINOUT information may be input in units of contents illustratively through the content server 10 or through terminal equipment connected to the server 10 by the content provider distributing contents by use of the content/advertisement providing system 1.

As described above, the advertisement selecting server 40 run by the advertisement selection business operator selects advertisement information to be inserted into the content requested by a given subscriber, the selection being made based on the results of the four types of matching (matching 1 through matching 4; see FIG. 5) between the attribute information held by the subscriber, advertisement information, and content on the one hand, and the OPTINOUT information on the other hand.

In other words, the advertisement selecting server 40 selects the advertisement information to be inserted into the content by judging comprehensively the interests of the subscriber, commercial sponsor, and content provider through the four types of matching. The results from these four types of matching are each scored by factors "a," "b," "c" and "d" (a+b+c+d=1) so that the advertisement selection business operator's policy may be reflected in the selection of advertisement information.

In each type of matching, the scored data may be used between different items. It is also possible to set penalty values for cases where advertisements overlap.

The advertisement selecting server 40 performs matching processes using the attribute information input for each subscriber, each advertisement, and each content as well as the OPTINOUT Information. There are two cases of matching with regard to the use of information: in one case, the input attribute information and OPTINOUT information are used unmodified; in the other case, the input attribute information and OPTINOUT information are further processed by the advertisement selecting server 40 before being put to use. FIG. 8 shows detailed data used by the advertisement selecting server 40 for matching purposes.

Where the subscriber attribute information is concerned, the attribute data and OPTINOUT data representing the subscriber's taste are generated from the same subscriber's OPTINOUT data at the time of matching. Where the subscriber OPTINOUT information is to be handled as the subscriber attribute data, the OPTINOUT data are divided into the positive and the negative sides so that the positive-side data and negative-side data are treated as attribute values. In such cases, at least either the positive or the negative side takes the value of zero.

The subscriber OPTINOUT information may be used as it is input at the time of matching. The advertisement OPTINOUT information may also be used as it is input upon matching.

Where the advertisement OPTINOUT information is concerned, the positive-side and negative-side TargetINOUT data are generated out of the TargetINOUT data applicable to the OPT category item at the time of matching, whereby two kinds of OPTINOUT data are reconstituted. This allows the commercial sponsor to perform subscriber targeting bidirectionally: either according to the subscriber's degree of preference for a specific item, or depending on the subscriber's degree of distaste for that item. Of the input TargetINOUT data, those corresponding to the subscriber attribute items are used unmodified at the time of matching.

The content-related attribute information and OPTINOUT information are used as they are input at the time of matching.

D. Extraction of Candidate Advertisements by the Rule Unit

Described below with reference to the flowchart of FIG. 9 are the steps carried out by the rule unit 41 of the advertisement selecting server 40 to extract candidates of advertisement information (candidate advertisements) to be inserted into the content requested by a subscriber.

In step S1, AdSelectRules.java is booted to initialize the context.

In step S2, data objects needed for the subscriber, advertisement information, and content are loaded. The data objects here refer to attribute information and OPTINOUT information input or processed with regard to the subscriber, advertisement information, and content.

In step S3, AdSelectRules.java and AdSelect.ilr are carried out to extract candidate advertisements according to rules.

Figure 10:
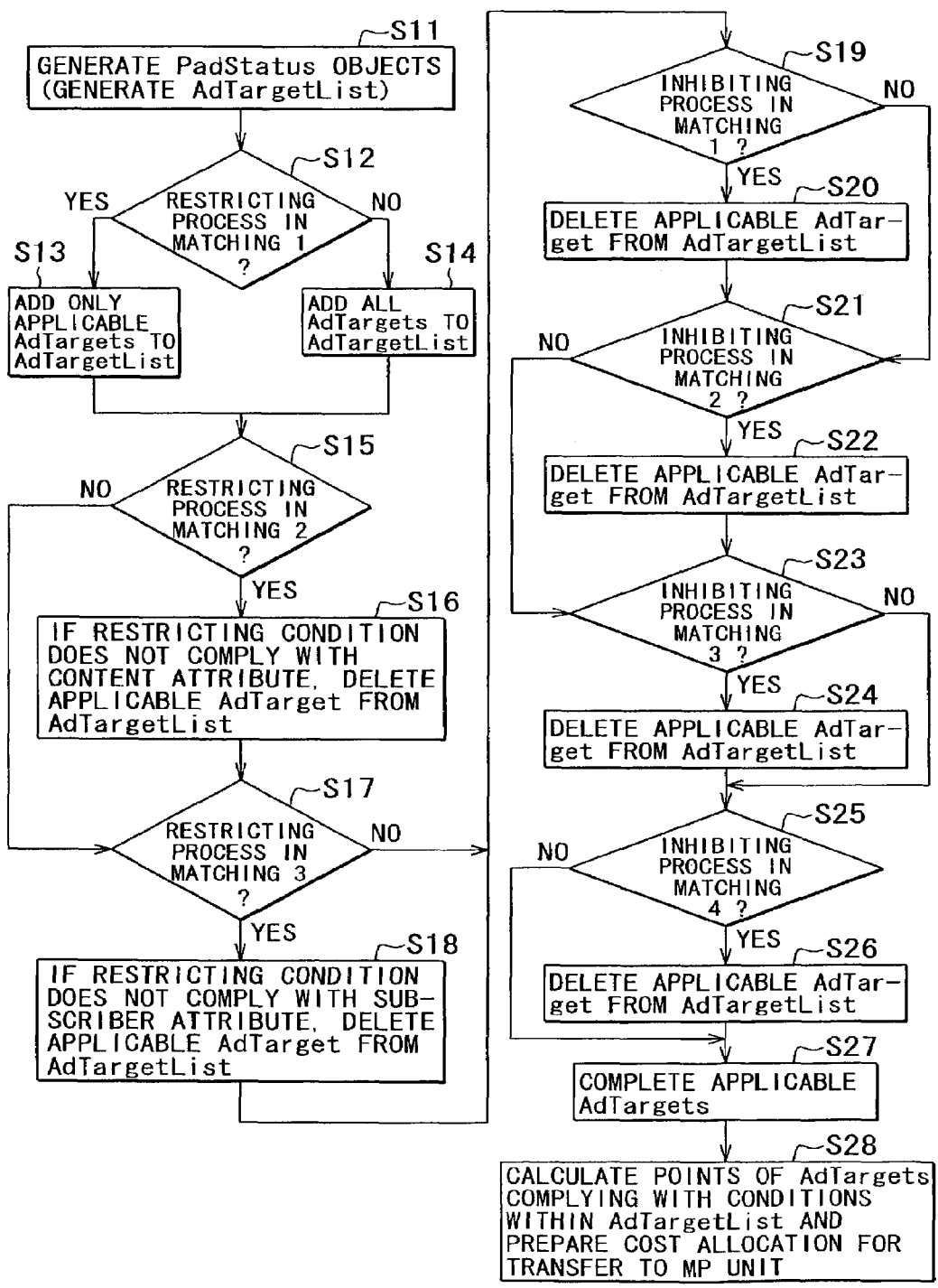
FIG. 10 is a flowchart of detailed steps for extracting candidate advertisements based on rules.

FIG. 10 is a flowchart of detailed steps performed by the rule unit 41 to extract candidate advertisements based on predetermined rules. In step S11, initialization is effected preparatory to extracting candidate advertisements. Specifically, PadStatus objects are generated so as to prepare AdList (a list of candidate advertisements) and AdTargetList (a list of candidate advertisement targets).

If there exist any rules over the contract of advertisement exposure, they need to be applied here. For example, if a specific day of the week or a specific time zone of the day is designated for the advertisement information, only those advertisements meeting the requirement are left as candidates in AdList.

In step S12, the restricting process of matching 1 is performed. More specifically, if there exist restricted advertisements applicable to matching 1, the applicable AdTargets alone are added to AdTargetList in step S13. If there are no such advertisements, all AdTargets are added to AdTargetList in step S14.

In any type of matching, it should be noted, any object to be compared is effective only if its attribute has a value larger than zero.

In step S15, the restricting process of matching 2 is performed. If there exist restricted advertisements applicable to matching 2 and the restricting condition does not comply with the content attribute, the applicable AdTargets are deleted from AdTargetList in step S16.

In step S17, the restricting process of matching 3 is carried out. If there exist restricted advertisements applicable to matching 3 and the restricting condition does not comply with the subscriber attribute, the applicable AdTargets are deleted from AdTargetList in step S18.

In step S19, the inhibiting process of matching 1 is performed. If there exist inhibited advertisements applicable to matching 1, the applicable AdTargets are deleted from AdTargetList in step S20.

In step S21, the inhibiting process of matching 2 is performed. If there exist inhibited advertisements applicable to matching 2, the applicable AdTargets are deleted from AdTargetList in step S22.

In step S23, the inhibiting process of matching 3 is carried out. If there exist inhibited advertisements applicable to matching 3, the applicable AdTargets are deleted from AdTargetList in step S24.

In step S25, the inhibiting process of matching 4 is carried out. If there exist inhibited advertisements applicable to matching 4, the applicable AdTargets are deleted from AdTargetList in step S26.

Following the restricting and inhibiting processes in the different types of matching, AdTargetList is completed in step S27.

With this embodiment, the items set as restricting type are verified before the items set as inhibiting type. The staggering arrangement reduces the number of processes to be carried out to extract candidate advertisements.

In step S28, cost allocation is prepared by calculating points of AdTragets by grading in numbers each of those AdTargets in AdTargetList which comply with the conditions involved. The cost allocation thus prepared is transferred to the MP unit 42 located downstream.

If the OPTINOUT information in which the grades and restricting conditions are established for all types of matching is judged to match the corresponding attributes during cost allocation preparation, then the cost of the applicable AdTarget for each type of matching is calculated, and the cost thus acquired is added to the cost allocation.

In this context, the score of the i-th AdTarget is expressed as follows:

k=number of items r=number of items such that $(C_k^{(oxy)} \times C_k^{(axy)})$ will not become zero (calculations are made with r=1 for BL2.)

if r≠0

$$costMxy^{(i)} = \frac{\sum_k (C_k^{(oxy)} \times C_k^{(axy)})}{r}$$

if r=0

$costMxy^{(i)}=0$

For this embodiment of the invention, the grade of any item furnished with a restricting condition is taken as 1.0.

FIG. 11 shows typical relations between the different types of matching on the one hand and the cost allocation on the other hand.

Based on the obtained cost for sub-matching types, the cost of each type of matching is given by the following expression:

$$costMx^{(i)} = \frac{\sum_{y=1}^{m} costMxy^{(i)}}{m}$$

(where, m=sub-matching count for Mx)

The policy of the advertisement selection business operator is reflected in the acquired cost for each type of matching. Where parameters for changing the score for matching are considered, the score of the i-th AdTarget is given by the following expression:

$$cost^{(i)} = \sum_{x=1}^{4} (C^{(p1)}[x] \times costMx^{(i)})$$

From this, the cost allocation to be handed over to the MP unit 42 is given as:

cost=[cost$^{(1)}$, cost$^{(2)}$, . . . , cost$^{(n)}$](n=number of loaded advertisements)

E. Assignment of Candidate Advertisements by the MP Unit

The content/advertisement providing system 1 of this embodiment allows the subscribers to request the content server 10 through their subscriber terminals 30 to provide streaming distribution of contents such as moving pictures. The content selected by each subscriber has a plurality of slots (generically represented by the j-th slot hereunder) in which advertisement information such as commercials may be inserted.

Figure 12:
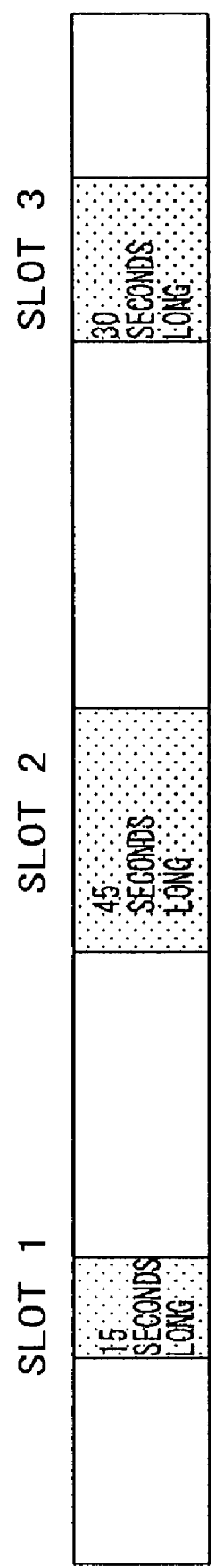
FIG. 12 is a schematic view of typical slot locations within a distributed content.
Figure 13:
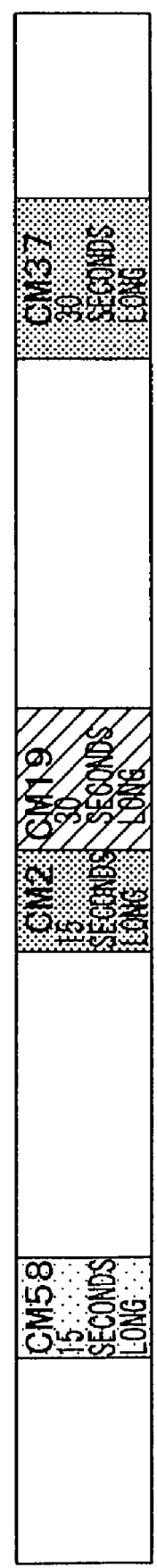
FIG. 13 is a schematic view showing how candidate advertisements are optimally inserted into slots.

The above-mentioned rule unit 41 hands multiple candidate advertisements to be inserted in each slot over to the MP unit 42 in cost allocation format. Based on the advertisement information costs transferred from the rule unit 41, the MP unit 42 fills the slots in the contents with appropriate advertisement information. Illustratively, as shown in FIG. 12, a short film made of moving pictures may have a 15-second slot 1, a 45-second slot 2, and a 30-second slot 3 in which to insert advertisements. FIG. 13 depicts how advertisements are assigned to these slots. Specifically, a 15-second advertisement (CM 58) is assigned to the slot 1; a 15-second advertisement (CM 2) and a 30-second advertisement (CM 19) are assigned to the slot 2; and a 30-second advertisement (CM 37) is assigned to the slot 3.

If the processing above is modeled using 0-1 integer programming, the conditions that apply when the i-th advertisement information is inserted into the j-th slot are constituted by the objective function (1) and constraint expression (2) given below:

Objective Function $$\sum_{i \in CM} \sum_{j \in Slot} (cost_i \times x_{ij}) \to \text{maximum} \quad (1)$$

Constraint Expression $$\forall j \in \text{slot} \sum_{i \in CM} (CMTime_i \times x_{ij}) = slotTime_j \quad (2)$$

where,
slotTime$_j$=length (time period) of each slot
i=0, 1, 2, . . . index of advertisement information
j=0, 1, 2, . . . index number of slot in content
$x_{ij} \in 0$ or 1: 1 for adopting i-th advertisement in j-th slot; 0 for not adopting it
CMtime$_i$=length (time period) of i-th advertisement
cost$_i$=score of i-th advertisement (the larger the value, the higher the priority)

The MP unit 42 solves a two-dimensional assignment problem involving the assignment of a plurality of candidate advertisements to a plurality of slots at an optimum degree of matching in consideration of the constraints to be discussed below. With this embodiment of the invention, the assignment problem is solved using 0-1 integer programming.

If the 0-1 integer programming problem were solved with no modifications, it should be noted, shorter advertisements would more likely be selected than longer ones for assignment. That is because the value of the objective function (1) above becomes greater the larger the number of shorter commercials selected. This inconvenience is bypassed by the embodiment using the following formula for modifying the score of each advertisement depending on its temporal length:

$$cost_i = cost_i \times \frac{CMTime_j}{\text{minimum } CM \text{ time unit}} \quad (3)$$

※where, the minimum commercial time unit is illustratively 15 seconds.

Alternatively, the cost calculation shown below is carried out to make sure that the longer the advertisements, the more advantageous their cost values. For example, it is considered more advantageous to fill a 60-second slot with one 60-second advertisement than with two 30-second advertisements.

※where, symbol ε stands for a value equal to or greater than zero (in practice, a very small value such as 0.0001 is used), and the minimum commercial time unit is illustratively 15 seconds.

Generally, there are demands from specific commercial sponsors for inserting the same advertisement information repeatedly into the same content. This embodiment of the invention meets such demands by performing expanded redefinition of an insertion-enabling variable $x_{ij}$ as many times as the i-th advertisement information is desired to be inserted into the j-th slot. That is, the assignment problem is solved by defining the same advertisement information as a different advertisement every time it is repeated.

Figure 14:
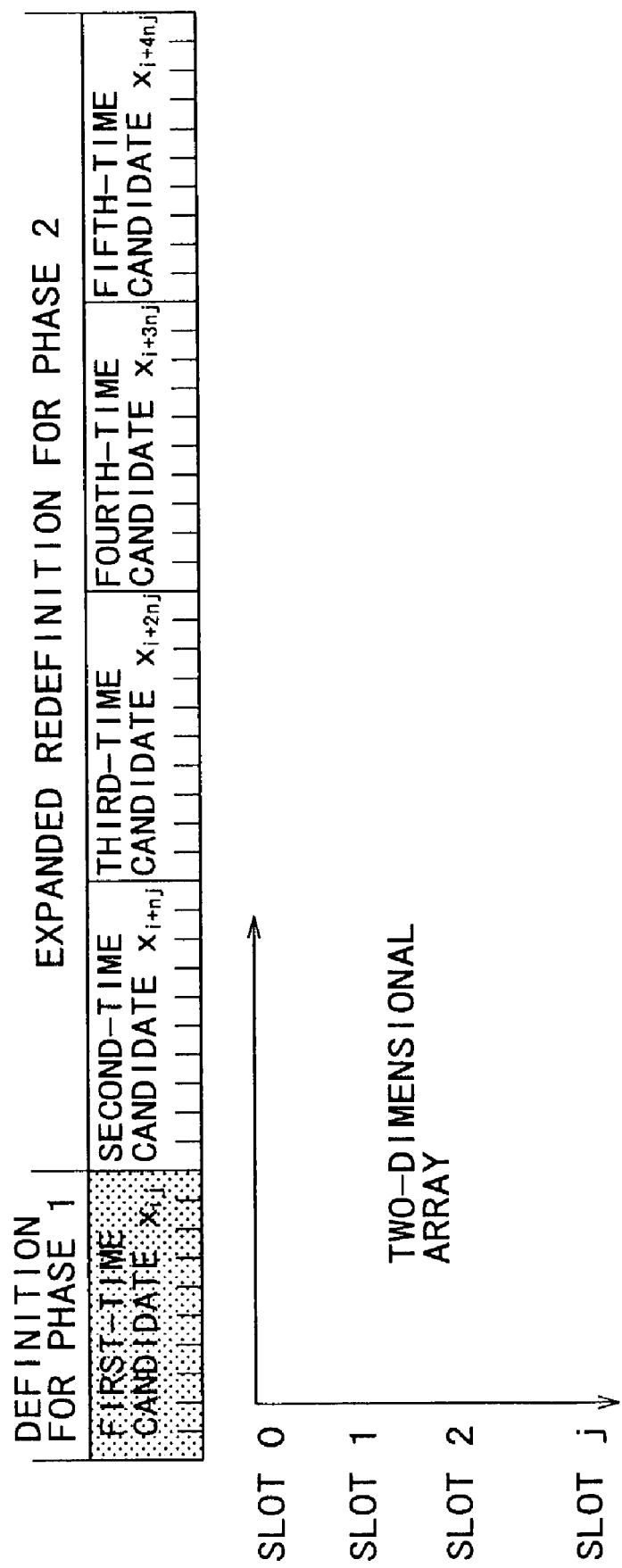
FIG. 14 is a schematic view depicting how the same advertisement information is typically inserted a number of times into a single content.

FIG. 14 shows a case in which the variable $x_{ij}$ is subject to expanded redefinition as many times as a desired repeatable insertion count so that the same advertisement information is inserted repeatedly into the same content. In this example, advertisement information "i" has the variable $x_{ij}$ initially defined for a first slot, and has the variable redefined as $x_{i+nj}$, $x_{i+2nj}$, $x_{i+3nj}$, and $x_{i+4nj}$ for a second, a third, a fourth, and a fifth slot respectively, so that the same advertisement information "i" is allowed to be inserted into the same content up to five times. Redefining the insertion-enabling variable for each new slot to be filled thus allows advertisement information to appear repeatedly in a single content.

The repeatable insertion count may alternatively be set for each advertisement. In this case, only the variables for permitting repeated insertion of the advertisement are enabled, and all other variables are excluded from the calculation. This makes it possible to reduce the number of variables to be computed and minimize any extension of the calculation time. Illustratively, suppose that a first candidate advertisement is desired to be inserted up to three times. In that case, the variables $x_{lj}$, $x_{l+nj}$, and $x_{l+2nj}$ are included in the calculation while the variables $x_{l+3nj}$ and $x_{l+4nj}$ are fixed to zero and excluded from the calculation.

Where the same advertisement information is inserted repeatedly into the same content, repetition in the same slot can be counterproductive (because it may bore or annoy subscribers while bringing the benefit only to specific commercial sponsors at the cost of other sponsors). This snag is avoided by this embodiment adding the following restricting condition:

$$\forall j \in \text{Slot} \sum_i x_{ij} \leq 1 \quad (4)$$

where repeatable insertion is allowed with $\forall i \in CM$.

If advertisement information from a specific sponsor is always given priority over other sponsors' advertisements, the neglected sponsors may resent the apparent favoritism and leave the content/advertisement providing system 1 outright. This can cripple the business model (i.e., the system as a whole). That eventuality is averted by cost recalculations. Specifically, even where the same advertisement information is allowed to be inserted into the same content a number of times, second-time and subsequently selected candidates $$cost_i = cost_i \times \frac{CMTime_j}{\text{minimum } CM \text{ time unit}} \times \left(1 + \frac{CMTime_j}{\text{minimum } CM \text{ time unit}} \varepsilon\right) \quad (3)$$

have their score reduced through cost recalculations so that the same advertisement information will not appear in an obviously preferred manner. FIG. 15 shows how such cost recalculations are performed to readjust the score of repeated candidate advertisements.

How the MP unit 42 assigns advertisements to slots in content is described below in more specific terms.

(1) Advertisement information is handled in units of AdTargets by the system components leading up to the rule unit 41. From the MP unit 42 on, the information is reconstituted into individual advertisements for processing. If an advertisement has a plurality of AdTargets, the highest of costs for the targets involved is regarded as the cost for the advertisement in question (alternatively, the costs may be averaged).

(2) Each slot is assigned an advertisement that falls within a designated period of time. If the advertisement lasts less than the designated time period, the slot may be retained for a predetermined time period (e.g., up to 15 seconds).

(3) The same advertisement may be assigned a plurality of times to different slots. It should be noted, however, that any advertisement may not appear more than a predetermined number of times in the same content.

(4) A two-phase selection scheme is adopted under processing time constraints. In phase 1, a sufficient number of advertisements are selected with no overlap from all candidates under the slot time constraint. The candidate advertisements are selected in units of AdTargets, as described in paragraph (1) above. Arrangements are made so that a plurality of AdTargets belonging to the same CM will not overlap.

In phase 2, a set of candidates selected in phase 1 is solved as a two-dimensional assignment problem for optimization. What needs to be considered at this point is the number of times each advertisement is allowed to be inserted in overlapping fashion in the same content handed over by use of a reach argument.

More detailed processes of the phases involved are discussed below.

Phase 1

In phase 1, a sufficient number of advertisements are selected under the slot time constraint, with no overlap within the same slot, from all candidate advertisements (discussed above) handed over from the rule unit 41. The conditions applicable to phase 1 are: information about the slot into which to insert the advertisement in the designated content, an advertisement variable array $x_i$, and a related information array.

If the length of a j-th slot in the content is represented by $slotTime_j$ (as mentioned above) and if there are three slots in a given content, the slots having lengths of 45 seconds, 30 seconds, and 60 seconds respectively, the lengths of these slots may be expressed as: slotTime[0]=45, slotTime[1]=30, slotTime[2]=60.

The advertisement variable array $x_i$ and related information array are determined as described above.

For each slot, an integer programming problem made up of the above-mentioned objective function (1) and constraint function (2) is solved. The advertisement variable array $x_i$ is fixed to zero for this embodiment so that any advertisement selected for a given slot will not be selected for the next slot.

The actual flow of processes for solving the integer programming problem above is shown below in the form of a pseudo-code.

```
For (j=0;j< No. of slots; j++) {
    // Set the following constraints in the model
    environment of CPLEX:
```

$$\sum_i cost_i \times x_i \to max$$

$$\sum_i CMTime_i \times x_i \to slotTime_j$$

```
    // Solve the CPLEX problem.
    cplex.solve( );
    // Set CheckFlag to 1 for the selected
    advertisement (CM).
    for(i=0;i< No. of candidate advertisements i++)
        if(x[i] !=0)CheckFlag[i]=1;
    // In order to avoid assigning the once-selected CM
    xi to the next slot;
    // Exclude this from the calculation (✕1).
    for(i=0;i< No. of candidate advertisements i++) {
    if(checkFlag[i]==1) X[i] .setUb(0.0);
    }
}
```

✕1) Fixing the upper limit of $x_i$ to 0 causes the once-selected advertisement to be excluded from the calculation for the next slot. In practice, a method x[i].setUb(0.0) is used for setting values, where x[i] denotes a special array type called IloNumVarArray used as a variable in the Cplex calculation.

Solving the integer programming problem gives answers in a manner assigning candidate advertisements to different slots as shown below. The set of candidate advertisements obtained in phase 1 is forwarded to phase 2 where more detailed assignment problems will be solved.

Answer to slot 0
$x_i$=0, 1, 1, 0 . . . 0, . . . 0
Answer to slot 1
$x_i$=1, 0, 0, 0 . . . 1, . . . 0
Answer to slot 2
$x_i$=0, 0, 0, 1 . . . 0, . . . 0
OR of the above answers provides:
$checkFlag_i$=1, 1, 1, 1, . . . 1, . . . 0

Phase 2

In phase 2, the set of candidate advertisements narrowed down in phase 1 is subjected to a redefinition process including the score of individual candidates for the reasons to be explained below. Definitive two-dimensional assignment problems are then solved for the slots.

One object of redefining candidate advertisements is both to let the same advertisement information be inserted repeatedly and to change score for advertisements having different lengths. Illustratively, where the objective function is set to be maximized in value, a 30-second slot can be preferentially assigned two 15-second advertisements instead of a single 30-second advertisement.

Another object of the redefinition of a set of candidate advertisements is to deal with cases where the number of candidates making up the set is smaller than the number of available slots. If, say, three slots are not filled with as many candidate advertisements, then special advertisement information provided by the advertisement selection business operator may illustratively be inserted instead.

In phase 2, the two-dimensional assignment problem is solved given the following two new conditions:

(1) Number of times an advertisement is inserted repeatedly within the same content
$reach_i$=No. of times each advertisement can be inserted (repeatable up to 5 times)

i=0, 1, 2, . . . advertisement index (<No. of candidate advertisements)

(2) Expanded candidate advertisement array x$_{ij}$∈0 or 1: 1 for adopting an I-th advertisement (AdTarget) in slot j; 0 for not adopting it CMTimePhase2$_i$=length of the advertisement (time period); expandable by up to 5 times costPhase2$_i$=score for the advertisement; expandable by up to 5 times i=0, 1, 2, . . . advertisement index (<No. of candidate advertisements×5)

j=0, 1, 2, . . . slot number

In phase 2, one advertisement (AdTarget) is scored differently so as to be handled as different advertisements over time, i.e., one for first-time use, another scored differently for second-time use, . . . , and another otherwise scored for fifth-time use. More specifically, for a typical redefinition process such as one shown in FIG. 14, the set of candidate advertisements selected in phase 1 is expanded by a factor of a repeatable insertion count to constitute a two-dimensional array x$_{ij}$ in conjunction with the slots available for insertion. For an expanded redefinition process such as one indicated in FIG. 15, the cost of advertisements is also expanded by a factor of the repeatable insertion count.

In phase 2, a five-fold expanded cost allocation is represented by costPhase2 in the objective function and constraint expression which are redefined as follows:

$$\forall\, j \in SLOT \sum_{i \in CM} costphase2_i \times x_{ij} \to \max$$

$$\sum_{i \in CM} \sum_{j \in Slot} CMTimephase2_i \times x_{ij} = slotTime_j$$

Where overlapping is allowed with $\forall\, i \in CM$, $$\forall\, j \in SLOT \sum_{i} x_{ij} \leq 1$$

Figures 17, 18:
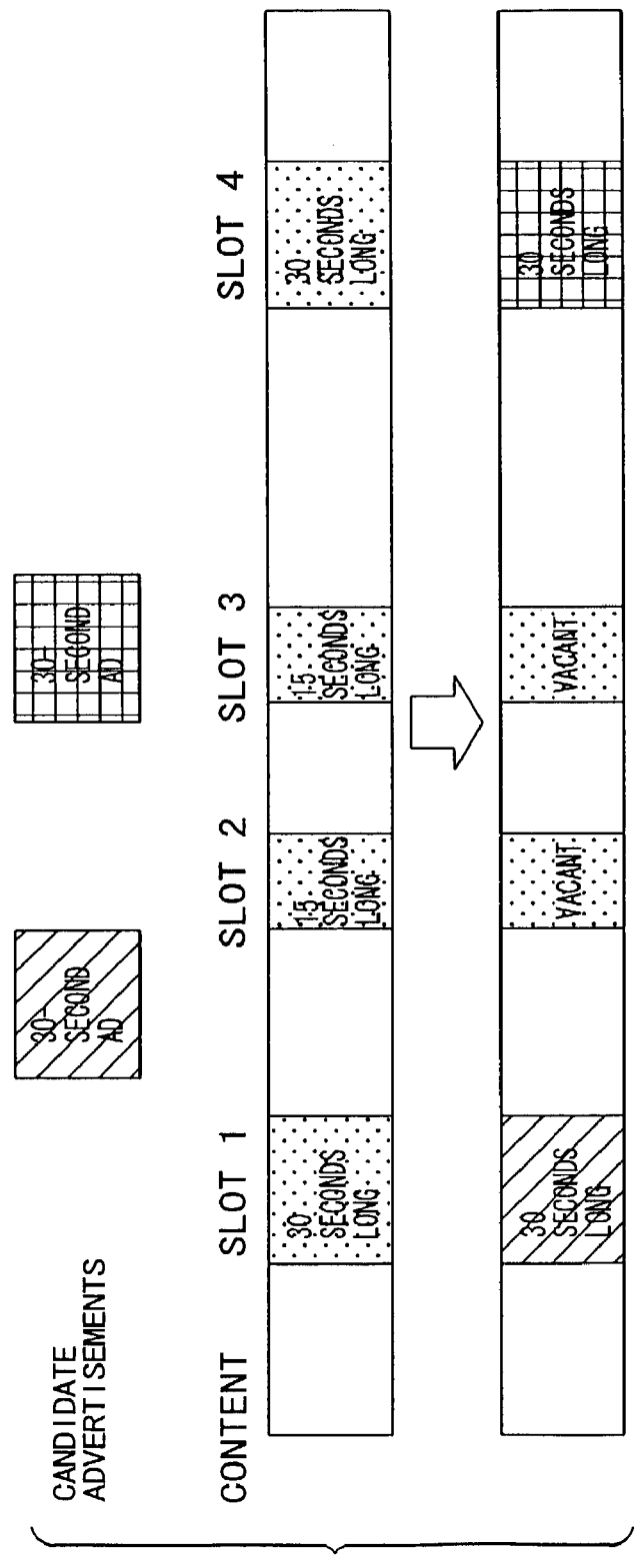
FIG. 17 is a schematic view giving a comprehensive sketch of the results of processing performed by the MP unit 42 in phase 2 shown in FIG. 16.
FIG. 18 is a schematic view showing a case where the number of candidate advertisements falls short of the number of slots.

As a result of the processing in phase 2, it might happen that given a total of five candidate advertisements and a total of three slots, the first of advertisement candidate is inserted into slots 0 and 1, the second of advertisement candidate into slots 0 and 2, . . . , and the fifth of advertisement candidate into slot 1. In such a case, the processed result is output in a format such as one shown in FIG. 16. FIG. 17 shows a more comprehensive picture of what has taken place as the result of such processing.

F. What to Do if Candidate Advertisements are Fewer than Slot

If the objective function (1) and the constraint expression (2) above are handled as a two-dimensional assignment problem to be solved using 0-1 integer programming and if there are fewer candidate advertisements than available slots, the processing might be aborted without the problem being solved.

Figure 19:
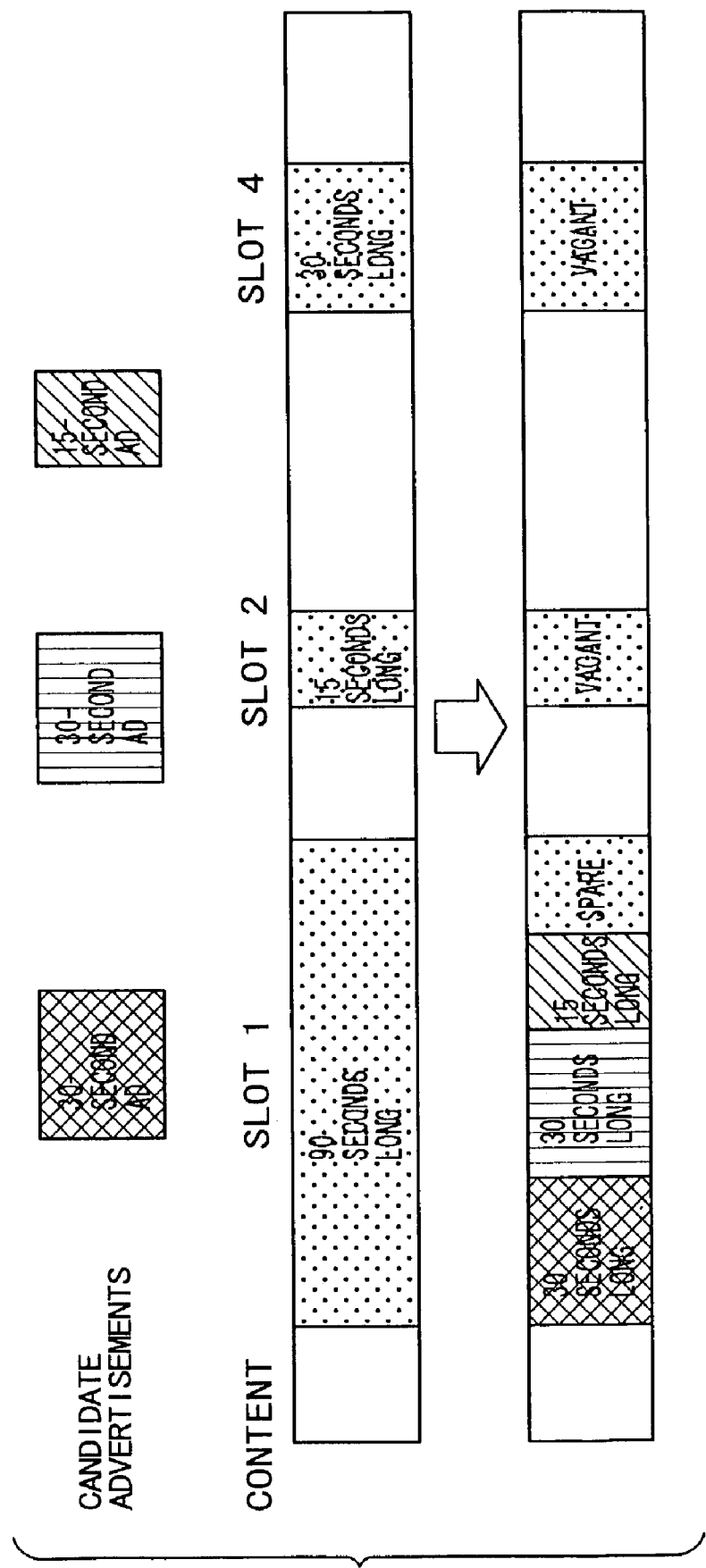
FIG. 19 is a schematic view sketching another case where the number of candidate advertisements falls short of the number of slots.

In the example of FIG. 18, the content has two 30-second slots and two 15-second slots. But there are only two 30-second candidate advertisements, so that the two 15-second slots are left empty. This causes the processing to abort without satisfying the constraint expression (2). In the case of FIG. 19, the content has one 90-second slot, one 15-second slot, and one 30-second slot. There are two 30-second candidate advertisements and one 15-second candidate advertisement, so that not all slots are filled. This also causes the processing to abort with the constraint expression (2) left unsatisfied.

The trouble above is averted by inserting the candidate advertisements into as much space of the slots as possible and simply leaving the vacant slots as they are. This meets one of the preconditions of this business model that advertising fees are gained by inserting advertisement information into slots.

Alternatively, before the constraint expression is solved, a check may be made to see if there exist enough candidate advertisements to fill the slots. If the candidate advertisements are judged to be fewer than the available slots, then the assignment problem may be solved with regard to each slot.

If one of the following two conditions is met, it can be judged that the number of candidate advertisements falls short of the number of slots:

(1) The number of all candidate advertisements is smaller than the number of all slots; or (2) The sum of the times of all candidate advertisements is less than the sum of all slot times.

For the condition (2) above, the repeatable insertion count of each candidate advertisement is also considered. This is done by rendering the condition (2) into the following expression:

$$\sum_{i} (CMTime_i \times NumOfDuplicate_i) = \sum_{j} slotTime_j \quad (5)$$

where, slotTime$_j$: length (time period) of each slot in which to insert advertisement in content CMTime$_i$: length (time period) of each advertisement; expandable by up to 5 times NumOfDuplicate$_i$: repeatable insertion count of the advertisement in question i=0, 1, 2 . . . advertisement index j=0, 1, 2 . . . number of slot in content If the number of candidate advertisements is judged to fall short of the number of available slots, the candidate advertisement assignment problem is solved using integer programming with regard to each slot. In this case, the following integer programming problem is solved using the expressions shown with respect to a given slot "j," eventually covering all slots:

Objective Function $$\sum_{i} (COST_i \times y_i) \to \max \quad (6)$$

Constraint Expression $$\sum_{i} (CMTime_i \times y_i) = slotTime_j \quad (7)$$

where, slotTimme$_j$: length (time period) of each slot in which to insert advertisement in content y$_i$∈0 or 1: 1 for adopting a given advertisement; 0 for not adopting it CMTime$_i$: length (time period) of each advertisement; expandable by up to 5 times cost$_i$: score of the advertisement; the greater the score, the higher the priority i=0, 1, 2, . . . advertisement index j=0, 1, 2, . . . number of slot in content Since the expression (7) above is an inequality, there is no need for the inserted advertisement information to coincide completely with the slot size upon assignment.

The advertisement information selected for one slot is excluded (fixed to yi=0) from all other slots. If the advertisement of interest is judged set for repeatable insertion, that advertisement is allowed to be selected for the next slot provided the repeatable insertion count is not exceeded.

FIG. 20 shows how the candidate advertisement assignment problem is typically solved with regard to each slot. Once selected, the advertisement information is removed from the candidate advertisements.

When the candidate advertisement assignment problem is solved for each slot using integer programming as described above, some slots may be left vacant or only partially filled. In such cases, the unfulfilled slots may be left empty, with the content forward-justified for distribution. Alternatively, emergency information (e.g., wild-card advertisements) may be inserted to fill the slots.

Figure 21:
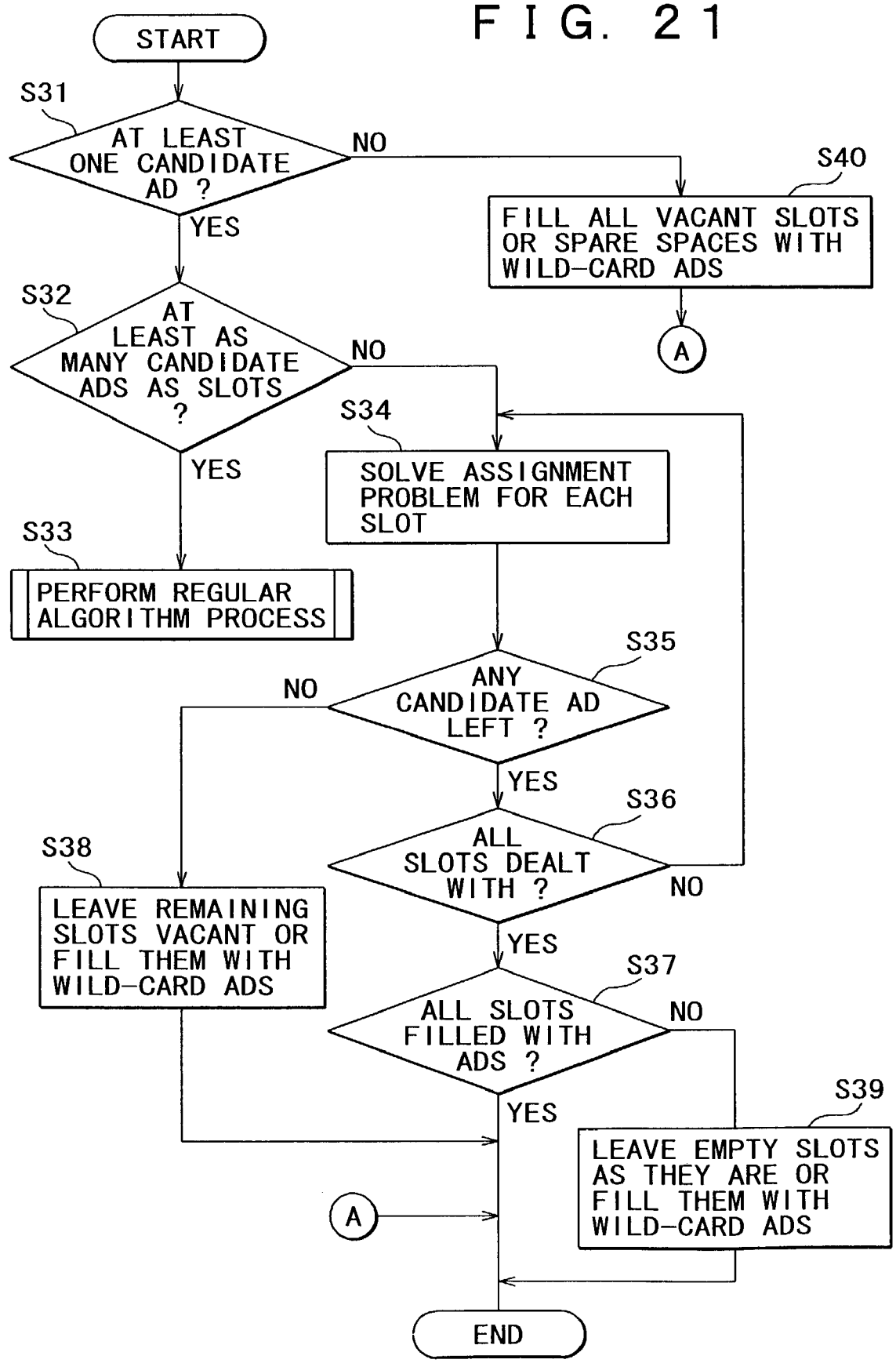
FIG. 21 is a flowchart of steps for solving the candidate advertisement assignment problem where the number of candidate advertisements falls short of the number of slots.

FIG. 21 is a flowchart of steps for solving the candidate advertisement assignment problem where the number of candidate advertisements falls short of the number of slots.

In step S31, a check is made to see if there is at least one candidate advertisement. If no candidate advertisement is judged to exist, step S40 is reached. In step S40, all slots or spare spaces are filled with wild-card advertisements, and this processing routine is terminated.

If, in step S31, at least one candidate advertisement is judged to exist, step S32 is reached. In step S32, a check is made to see if a sufficient number of candidate advertisements are provided to fill the slots. More specifically, it is determined whether the number of candidate advertisements is at least equal to the number of slots, or whether the sum of the time periods of the candidate advertisements is at least equal to the total slot time. The check is made by solving the expression (5) above.

If in step S32 a sufficient number of candidate advertisements are judged to exist for the available slots, step S33 is reached. In step S33, a regular algorithm process is carried out.

If in step S32 the number of candidate advertisements is judged to fall short of the number of slots, step S34 is reached. In step S34, the candidate advertisement assignment problem is solved regarding each slot using integer programming. Specifically, the objective function (6) and expression (7) (control expression) are used to solve the integer problem for each slot.

In step S35, a check is made to see if there is any more candidate advertisement left. If any candidate advertisement is judged to exist, step S36 is reached. In step S36, a check is made to see if the assignment problem is solved with regard to all slots. If any slot is judged to be left untreated, step S34 is reached again and the assignment problem is solved regarding that slot.

If all slots are judged to have been dealt with, step S37 is reached. In step S37, a check is made to see if all slots are filled with advertisement information. If all slots are judged to have been filled, then this processing routine is terminated. If any slot is judged to be left unfilled, the vacant slot is either left empty or filled with wild-card advertisement information in step S39, and the processing routine is brought to an end.

If in step S35 no more candidate advertisement is judged to exist, then the unfilled slots are either left empty or filled with wild-card advertisement information in step S38. The processing routine is then terminated.

Where the advertisement information assignment problem is solved with respect to each slot in the manner outlined in FIG. 21, the advantage is that effective candidates are preferentially inserted into slots located earlier in the content, with latter slots left vacant if devoid of advertisements. If there is no need to consider priorities between different slots in the content, then the expression (2) as shown below before the two-dimensional assignment problem is solved. In this case, the inserted advertisement information may be distributed throughout the slots in the content.

$$\forall j \in \text{Slot} \sum_{i \in CM} (CMTime_i \times x_{ij}) = slotTime_j \quad (8)$$

where, slotTime$_j$: length (time period) of each slot in which to insert advertisement in content $x_{ij}$: 1 for adopting the i-th advertisement in j-th slot; 0 for not adopting it CMTime$_i$: length (time period) of each advertisement; expandable by up to 5 times cost$_i$: score of the advertisement; the greater the score, the higher the priority i=0, 1, 2 . . . advertisement index j=0, 1, 2 . . . number of slot in content The above method may be modified to provide other controls such as the preferred insertion of particular advertisement information into the earlier slots in the content. This can be achieved by simply introducing a slot-specific priority variable into the objective function (1) shown above.

The newly introduced variable is:

slotCostj: variable representative of the priority of each slot

Thus the objective function turns out to be:

$$\sum_{i \in CM} \sum_{j \in Slot} (cost_i \times x_{ij} \times slotCost_j) \to \text{maximum} \quad (9)$$

G. What to Do to Reduce the Number of Variables for Integer Programming

When the advertisement information assignment problem is solved for each slot using the expressions (1) and (2) above, the number of necessary variables $x_{ij}$ is determined by the number of candidate advertisements multiplied by the number of slots. The larger the number of candidate advertisements, the longer the time it may take to carry out the calculations involved. In particular, the presence of candidate advertisements subject to repeatable insertion requires expanded redefinition of variables as shown in FIGS. 12 through 14 (i.e., addition of variables for dealing with "clones" of the advertisement information in question), which further increases the number of variables to be computed.

The ever-increasing number of variables is controlled illustratively by resorting to a two-phase processing scheme, to be described below. This scheme was explained in part using the pseudo code format in the latter half of the earlier description, "E. Assignment of candidate advertisements by the MP unit." The scheme will now be discussed further with a more detailed algorithm in conjunction with what may be called a definitive system embodiment of this invention.

Phase 1

Figure 22:
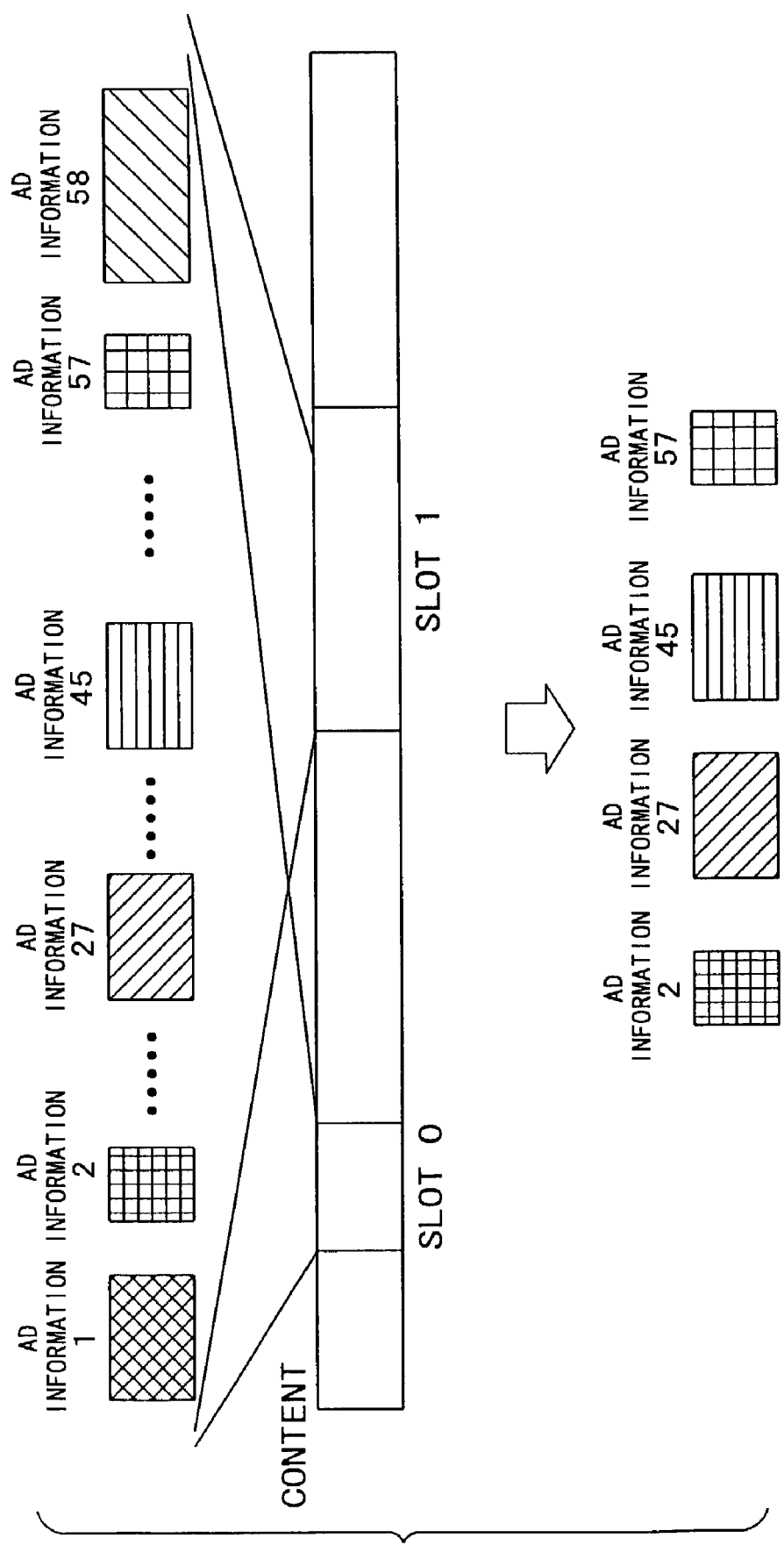
FIG. 22 is an explanatory view of a procedure (phase 1) for reducing the number of variables to be calculated by integer programming.
Figure 23:
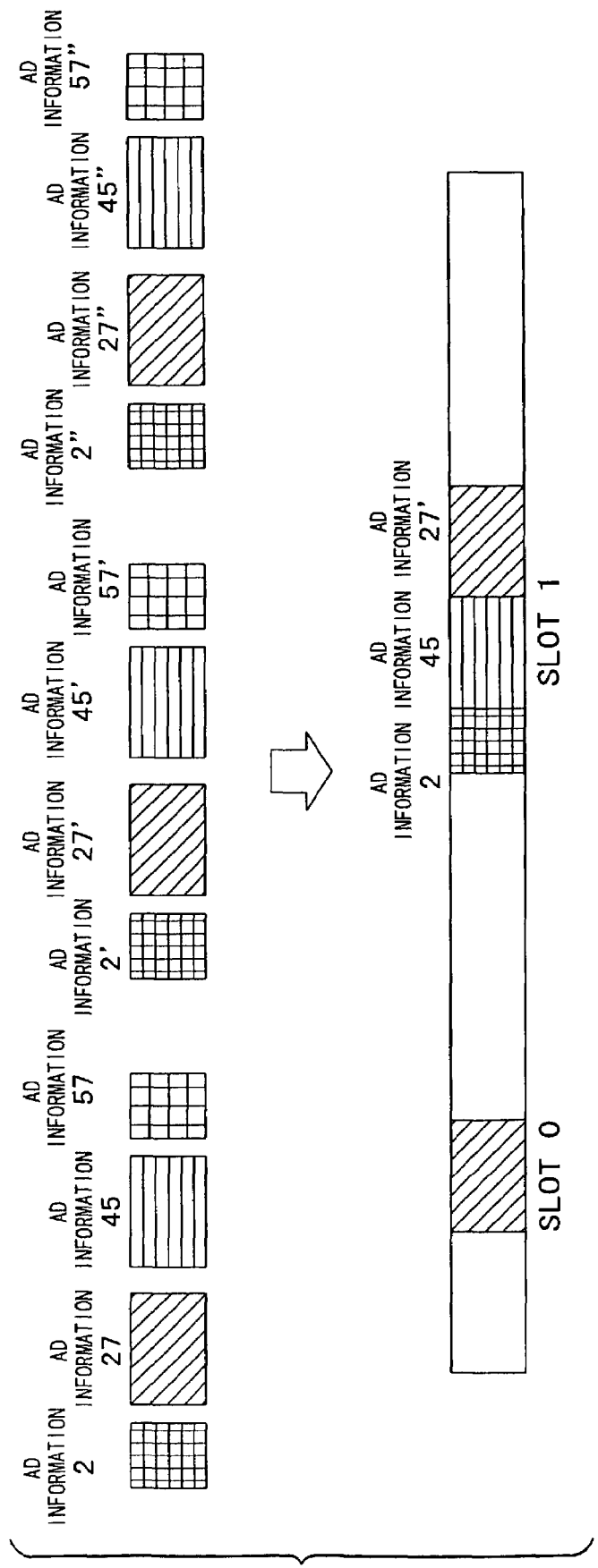
FIG. 23 is an explanatory view of another procedure (phase 2) for reducing the number of variables to be calculated by integer programming.

The advertisement information assignment problem is solved for each slot, and the selected advertisement information is added to a set of candidate advertisements (see FIG. 22). In this phase, a sufficient number of candidate advertisements making up the candidate set are selected with no overlap allowed between the selected advertisements.

Phase 2

For the set of candidates selected in phase 1 above, the variables involved are subjected to expanded redefinition as shown in FIGS. 14 and 15 to allow for repeatable insertion (the value "n" in the figures stands for the number of candidate advertisements narrowed down in phase 1). Then the two-dimensional assignment problem expressed by the expressions (1) and (2) above is solved. The advertisement information allowed for repeatable insertion is redefined by the expanded redefinition process as another advertisement information having a different cost value for second-time and subsequent uses. The redefined advertisements are solved all at once as a two-dimensional assignment problem for all slots. The same advertisement information is not assigned again to the same slot. A repeatable insertion count may be set for each advertisement. The variables of only those advertisements allowed for repeatable insertion are enabled, and the variables of the other advertisements are excluded from the calculations. This helps to reduce the number of variables to be computed and thereby minimize prolongation of the calculation time. Suppose, in the example of FIG. 14, that the first of advertisement candidate is allowed to be inserted up to three times. In that case, the variables $x_{lj}$, $x_{l+nj}$, and $x_{l+2nj}$ are included in the calculation while the variables $x_{l+3nj}$ and $x_{l+4nj}$ are fixed to zero and excluded from the calculation.

As described, only the advertisements selected in phase 1 are taken as the candidates so that the number of variables to be computed in the two-dimensional assignment problem in phase 2 is reduced. Solving the problem in phase 1 narrows the candidates down to the advertisement information which turns out to be effective and which has already been assigned to the length of each slot. This arrangement allows for a minimum of deterioration in the accuracy of optimum assignment as opposed to cases where the assignment problem is solved for all candidate advertisements using the expressions (1) and (2) above.

The integer programming problem is solved in phase 1 using the following expressions:

Objective Function $$\sum_i (cost_i \times y_i) \to \max \qquad (10)$$

Constraint Expression $$\sum_i CMTime_i \times y_i = slotTime_j \qquad (11)$$

where, slotTime$_j$: length (time period) of each slot in which to insert advertisement in content $y_i \in 0$ or 1: 1 for adopting an advertisement (AdTarget); 0 for not adopting it CMTime$_i$: length (time period) of each advertisement; expandable by up to 5 times cost$_i$: score of the advertisement; the greater the score, the higher the priority i=0, 1, 2 ... advertisement index j=0, 1, 2 ... number of slot in content Once selected for any one slot, the advertisement information is removed (fixed to $y_i=0$) from the candidate so as not to be selected for any other slot. This also applies to the advertisement information allowed for repeatable insertion. The readjustment of the cost value defined in the expression (3) above is carried out.

Figure 24:
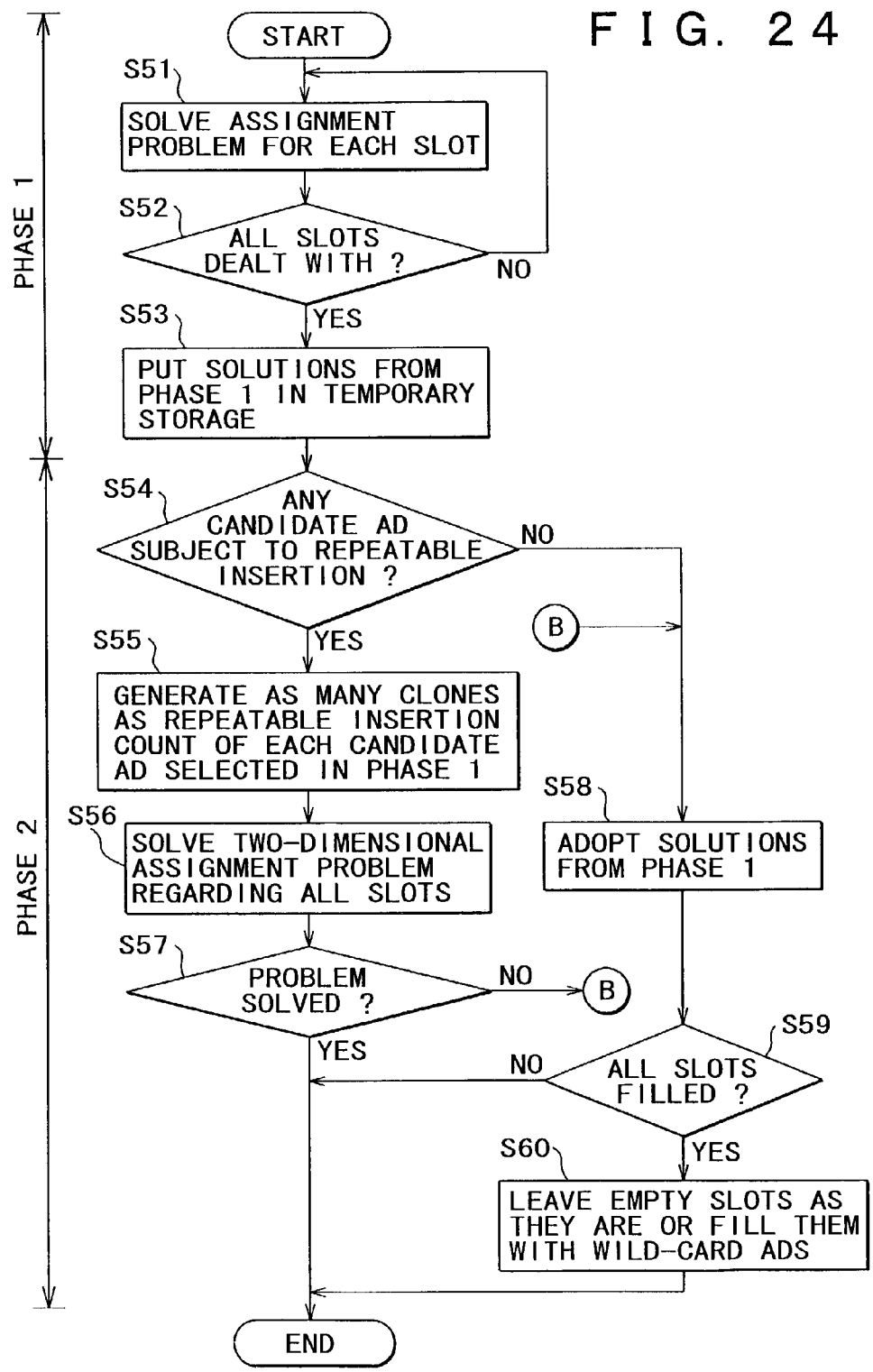
FIG. 24 is a flowchart of steps for solving the problem of assigning advertisement information to slots using a two-phase scheme in an attempt to reduce the number of variables to be calculated in integer programming.

FIG. 24 is a flowchart of steps for solving the problem of assigning advertisement information to slots using the above-described two-phase scheme in order to reduce the number of variables to be calculated in integer programming.

In steps S51 and S52 constituting phase 1, the advertisement information assignment problem is solved for each slot using integer programming as defined by the expressions (10) and (11) above. And in step S53, the solutions obtained in phase 1 are placed in temporary storage.

In step S54 introducing phase 2, a check is made to see whether there is any candidate advertisement subject to repeatable insertion.

If in step S54 any candidate advertisement allowed for repeatable insertion is judged to exist, step S55 is reached. In step S55, as many clones of each candidate advertisement selected in phase 1 are generated as the repeatable insertion count of that candidate. In step S56, the two-dimensional assignment problem is solved regarding all slots. If the problem is solved, the solution is returned and the processing routine is brought to an end.

If in step S54 no candidate advertisement subject to repeatable insertion is judged to exist, or if the two-dimensional problem is not judged to be solved in step S57, then step S58 is reached. In step S58, the solutions from phase 1 are adopted as they are.

In step S59, a check is made to see if all slots have been filled. If all slots are judged to have been filled, the solutions are returned and the processing routine is terminated. If not all slots are filled, then step S60 is reached in which the empty slots are left as they are or filled with wild-card advertisements. The solutions are then returned and the processing routine is brought to an end.

Addendum

Although the description above contains many specificities, these should not be construed as limiting the scope of the invention but as merely providing illustrations of some of the presently preferred embodiments of this invention. It is evident that many alternatives, modifications and variations will become apparent to those skilled in the art in light of the description.

For example, although the description above has focused primarily on the service of distributing image contents to personal computers over the Internet, this is not limitative of the invention. Alternatively, the advertisement selecting method of this invention may also be applied to content-providing services involving mobile terminals such as mobile telephones and PDAs (personal digital assistants), as well as to bi-directional information services associated with digital TV.

As another alternative, the inventive advertisement selecting method may be applied to content-providing services involving suitable distribution means allowing packaged contents such as DVDs (digital versatile discs) to be supplemented with commercial images being offered over the Internet. In such cases, the packaged contents like the DVDs are expected to be distributed free of charge or at a low cost.

Thus the scope of the invention should be determined by the appended claims and their legal equivalents, rather than by the examples given.

INDUSTRIAL APPLICABILITY

The invention provides an advertisement inserting apparatus, an advertisement inserting method, and a storage medium for properly inserting advertisement information into contents such as moving pictures that are distributed over a wide-area network such as the Internet.

The invention also provides an advertisement inserting apparatus, an advertisement inserting method, and a storage medium for inserting, in a manner selectively personalized for each subscriber, advertisement information into contents such as moving pictures that are offered to the subscribers under a pull-type distribution scheme over the Internet or similar networks.

The invention further provides an advertisement inserting apparatus, an advertisement inserting method, and a storage medium for selectively inserting advertisement information into contents such as moving pictures in a manner corresponding to individual advertisement insertion frames called slots having a predetermined insertion time (i.e., length) each within the contents.

Illustratively, as recent advances in the streaming technology accelerate widespread use of the advertisement distribution services customized to individual subscribers, advertisements are expected to diversify to such an extent that their volumes and types will grow explosively. Although it is impossible to get the subscribers to watch all candidate advertisements inserted into distributed contents, the invention provides a system that calculates dynamically on how to assign advertisements to slots under existing display constraints (i.e., time constraints that apply conventionally when commercials are inserted into TV broadcasts, or display area constraints applicable when commercials are shown divided on a single screen).

The invention claimed is:

1. An advertisement inserting apparatus for selecting advertisement information from a plurality of candidate advertisements for insertion into a slot in content, the advertisement inserting apparatus comprising:
   a processor;
   means for calculating a first cost component by comparing attribute information of the advertisement information with requirements of a content provider;
   means for calculating a second cost component by comparing attribute information of the content with requirements of a commercial sponsor;
   means for calculating a third cost component by comparing attribute information of a subscriber and requirements of the subscriber with the requirements of the commercial sponsor;
   means for calculating a fourth cost component by comparing the attribute information of the advertisement information with the requirements of the subscriber;
   means for calculating a customized cost allocation for the advertisement information by adding a first scoring factor multiplied by the first cost component, a second scoring factor multiplied by the second cost component, a third scoring factor multiplied by the third cost component, and a fourth scoring factor multiplied by the fourth cost component;
   means for calculating a cost value of the advertisement information based on the customized cost allocation and a length of the advertisement information;
   means for establishing selection conditions, the selection conditions comprising an objective function and a constraint expression, the objective function maximizing a total of cost values of the advertisement information, the constraint expression equalizing totaled lengths of the advertisement information with a length of the slot; and
   means for selecting the advertisement information from the plurality of candidate advertisements based on the selection conditions;
   wherein the content provider provides the content, the commercial sponsor offers the advertisement information to be attached to the content, and the subscriber views the content.

2. The advertisement inserting apparatus according to claim 1, wherein the content comprises a plurality of slots, wherein the advertisement information can appear a plurality of times in the content, further comprising:
   means for redefining the advertisement information as a different candidate advertisement a repeatable insertion count number of times.

3. The advertisement inserting apparatus according to claim 2, wherein the means for redefining further comprises means for adding to the selection conditions a restricting condition for inhibiting the same advertisement information from appearing more than once in the slot.

4. The advertisement inserting apparatus according to claim 2, wherein the means for redefining further comprises means for reducing a score of a cost value of a redefined candidate advertisement so that the advertisement information will not be selected preferentially for repeated insertion.

5. The advertisement inserting apparatus according to claim 2, further comprising means for determining whether a number of candidate advertisements is equal to or more than a number of slots;
   wherein, if the number of candidate advertisements is not equal to or more than the number of slots, then the means for selecting generates a set of candidate advertisements using integer programming so that the advertisement information to be inserted into the slot is selected from the set of candidate advertisements based on the repeatable insertion count.

6. The advertisement inserting apparatus according to claim 1, further comprising means for determining whether a number of candidate advertisements is equal to or more than a number of slots;
   wherein, if the number of candidate advertisements is not equal to or more than the number of slots, then the means for selecting uses integer programming.

7. The advertisement inserting apparatus according to claim 1, wherein a sum of the first scoring factor, the second scoring factor, the third scoring factor, and the fourth scoring factor equals one.

8. A method for selecting advertisement information from a plurality of candidate advertisements for insertion into a slot in a content, the method comprising:
   calculating, by a computer system comprising a processor and memory, a first cost component by comparing attribute information of the advertisement information with requirements of a content provider;
   calculating, by the computer system, a second cost component by comparing attribute information of the content with requirements of a commercial sponsor;
   calculating, by the computer system, a third cost component by comparing attribute information of a subscriber and requirements of the subscriber with the requirements of the commercial sponsor;
   calculating, by the computer system, a fourth cost component by comparing the attribute information of the advertisement information with the requirements of the subscriber;
   calculating, by the computer system, a customized cost allocation for the advertisement information by adding a first scoring factor multiplied by the first cost component, a second scoring factor multiplied by the second cost component, a third scoring factor multiplied by the third cost component, and a fourth scoring factor multiplied by the fourth cost component;

calculating, by the computer system, a cost value of the advertisement information based on the customized cost allocation and a length of the advertisement information;

establishing selection conditions, the selection conditions comprising an objective function and a constraint expression, the objective function maximizing a total of cost values of the advertisement information, the constraint expression equalizing totaled lengths of the advertisement information with a length of the slot; and selecting, by the computer system, the advertisement information from the plurality of candidate advertisements based on the selection conditions;

wherein the content provider provides the content, the commercial sponsor offers the advertisement information to be attached to the content, and the subscriber views the content.

9. The method according to claim 8, wherein the content comprises a plurality of slots, wherein the advertisement information can appear a plurality of times in the content, further comprising:

redefining the advertisement information as a different candidate advertisement a repeatable insertion count number of times.

10. The method according to claim 9, further comprising adding to the selection conditions a restricting condition for inhibiting the same advertisement information from appearing more than once in the slot.

11. The method according to claim 9, further comprising reducing a score of the cost value of a redefined candidate advertisement so that the advertisement information will not be selected preferentially for repeated insertion.

12. The method according to claim 9, further comprising:
determining whether the number of candidate advertisements is equal to or more than a number of slots;
generating a set of candidate advertisements using integer programming if the number of candidate advertisements is not equal to or more than the number of slots.

13. The method according to claim 8, further comprising:
determining whether a number of candidate advertisements is equal to or more than a number of slots;
selecting using integer programming if the number of candidate advertisements is not equal to or more than the number of slots.

14. The method according to claim 8, wherein a sum of the first scoring factor, the second scoring factor, the third scoring factor, and the fourth scoring factor equals one.

15. A computer-readable media storing a program for causing a computer to execute a method for selecting advertisement information from a plurality of candidate advertisements for insertion into a slot in content, the method comprising:

calculating a first cost component by comparing attribute information of the advertisement information with requirements of a content provider;

calculating a second cost component by comparing attribute information of the content with requirements of a commercial sponsor;

calculating a third cost component by comparing attribute information of a subscriber and requirements of the subscriber with the requirements of the commercial sponsor;

calculating a fourth cost component by comparing the attribute information of the advertisement information with the requirements of the subscriber;

calculating a customized cost allocation for the advertisement information by adding a first scoring factor multiplied by the first cost component, a second scoring factor multiplied by the second cost component, a third scoring factor multiplied by the third cost component, and a fourth scoring factor multiplied by the fourth cost component;

calculating a cost value of the advertisement information based on the customized cost allocation and a length of the advertisement information;

establishing selection conditions, the selection conditions comprising an objective function and a constraint expression, the objective function maximizing a total of cost values of the advertisement information, the constraint expression equalizing totaled lengths of the advertisement information with a length of the slot; and selecting the advertisement information from the plurality of candidate advertisements based on the selection conditions;

wherein the content provider provides the content, the commercial sponsor offers the advertisement information to be attached to the content, and the subscriber views the content.

16. The computer-readable media according to claim 15, wherein a sum of the first scoring factor, the second scoring factor, the third scoring factor, and the fourth scoring factor equals one.

* * * * *